US 10,445,457 B1

(12) United States Patent
Loo

(10) Patent No.: US 10,445,457 B1
(45) Date of Patent: Oct. 15, 2019

(54) METHODS, SYSTEMS, AND ARTICLES OF MANUFACTURE FOR IMPLEMENTING A PHYSICAL DESIGN OF AN ELECTRONIC DESIGN WITH DFM AND DESIGN SPECIFICATION AWARENESS

(71) Applicant: Cadence Design Systems, Inc., San Jose, CA (US)

(72) Inventor: Kwang-Tatt Loo, Singapore (SG)

(73) Assignee: Cadence Design Systems, Inc., San Jose, CA (US)

( * ) Notice: Subject to any disclaimer, the term of this patent is extended or adjusted under 35 U.S.C. 154(b) by 382 days.

(21) Appl. No.: 15/199,304

(22) Filed: Jun. 30, 2016

(51) Int. Cl.
*G06F 17/50* (2006.01)

(52) U.S. Cl.
CPC ...... *G06F 17/5081* (2013.01); *G06F 17/5072* (2013.01); *G06F 17/5077* (2013.01); *G06F 2217/12* (2013.01)

(58) Field of Classification Search
CPC ............. G06F 17/5081; G06F 17/5072; G06F 17/5077; G06F 2217/12
See application file for complete search history.

(56) References Cited

U.S. PATENT DOCUMENTS

| 6,269,470 B1 * | 7/2001 | Paz ..................... G06F 17/5077 326/38 |
| 7,458,045 B2 * | 11/2008 | Cote ................... G06F 17/5036 716/103 |
| 8,187,924 B2 * | 5/2012 | Nakajima ........... G06F 17/5072 257/204 |
| 8,694,950 B2 * | 4/2014 | McSherry ........... G06F 17/5068 703/14 |
| 8,832,632 B1 * | 9/2014 | Chang ................. G06F 17/5077 716/126 |
| 9,396,301 B1 * | 7/2016 | Lee ..................... G06F 17/5077 |
| 9,740,815 B2 * | 8/2017 | Bickford ............. G06F 17/5081 |
| 2007/0214446 A1 * | 9/2007 | Lavin .................. G06F 17/5068 716/113 |
| 2008/0086709 A1 * | 4/2008 | Rittman .............. G06F 17/5081 716/52 |
| 2008/0141196 A1 * | 6/2008 | Ohshima ............. G06F 17/5068 716/112 |
| 2009/0319977 A1 * | 12/2009 | Saxena ............... G06F 17/5077 716/129 |

(Continued)

OTHER PUBLICATIONS

Lu, Zhijian, et al. "Analysis of temporal and spatial temperature gradients for IC reliability." University of Virginia Technical Report CS-2004 8 (2004).

(Continued)

*Primary Examiner* — Nha T Nguyen
(74) *Attorney, Agent, or Firm* — Vista IP Law Group, LLP

(57) ABSTRACT

Disclosed are techniques for implementing a physical design of an electronic design with design for manufacturing DFM and design specification awareness. These techniques identify one or more design specifications for generating a floorplan or a placement layout of an electronic design. Floorplanning or placement requirements are determined based in part or in whole upon pertinent electrical parasitics. The floorplan or the placement layout is generated at least by inserting a set of blocks based in part or in whole upon the floorplanning or placement requirements.

20 Claims, 14 Drawing Sheets

(56) References Cited

U.S. PATENT DOCUMENTS

| | | | | |
|---|---|---|---|---|
| 2012/0023471 A1* | 1/2012 | Fischer | ............... | G06F 17/5068 |
| | | | | 716/115 |
| 2012/0036491 A1* | 2/2012 | Ramji | ................. | G06F 17/5072 |
| | | | | 716/122 |
| 2014/0082580 A1* | 3/2014 | Bose | ....................... | G06F 17/50 |
| | | | | 716/133 |
| 2015/0269302 A1* | 9/2015 | Katta | .................. | G06F 17/5072 |
| | | | | 716/120 |
| 2015/0302128 A1* | 10/2015 | Katta | .................. | G06F 17/5072 |
| | | | | 716/120 |
| 2016/0063171 A1* | 3/2016 | Tripathi | ............... | G05B 19/418 |
| | | | | 716/136 |
| 2016/0267215 A1* | 9/2016 | Folberth | ............. | G06F 17/5077 |
| 2017/0116367 A1* | 4/2017 | Bickford | ............ | G06F 17/5081 |
| 2017/0230253 A1* | 8/2017 | Chopra | ................. | H04L 41/145 |

OTHER PUBLICATIONS

"Cadence Technology Files" URL: http://www.cs.utah.edu/~rfonnesb/ee6961/tutorials/techfile/, Apr. 2003, Accessed on Jun. 22, 2018.

"Template.tf", URL: http://www.cs.utah.edu/~rfonnesb/ee6961/tutorials/techfile/files/template.tf, Mar. 2003, Accessed on Jun. 22, 2018.

* cited by examiner

METHODS, SYSTEMS, AND ARTICLES OF MANUFACTURE FOR IMPLEMENTING A PHYSICAL DESIGN OF AN ELECTRONIC DESIGN WITH DFM AND DESIGN SPECIFICATION AWARENESS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design automation (EDA) tools are devised to communicate design intent and the circuit behavior between a circuit designer and other technical personnel such as design team member. With the number of transistors in an integrated circuit (IC) doubling approximately every two years according to the Moore's law, contemporary electronic designs have become increasingly bigger and more complex over time.

Conventional approaches start with generating a schematic design from one or more design specifications. A layout engineer may then invoke a floorplanning module or a placement module to generate a floorplan or placement for the blocks, cells, devices, and discrete circuit components based on the schematic design and subsequently employ a routing module to interconnect these blocks, cells, devices, and discrete circuit components to generate a post-route layout. When violations (e.g., violations in one or more design for manufacturing requirements or constraints) are found in the floorplan, placement layout, or post-route layout, layout engineers often use various layout modules to fix these errors. Because layout engineers often are not aware of or completely lack the knowledge of the design specifications upon which the electronic design is based, these layout engineers may freely modify a floorplan or layout so long as the final layout meets the requirements or constraints considered by these layout modules. As a result, violations of design rules, requirements, constraints, or preferences (collectively requirements for plural or requirement for singular) are often fixed at the expense of non-compliance with the design specifications.

Therefore, there exists a need for a method, system, and computer program product for implementing a physical design of an electronic design with design for manufacturing (DFM) and design specification awareness.

SUMMARY

Disclosed are method(s), system(s), and article(s) of manufacture for implementing a physical design of an electronic design with DFM and design specification awareness in various embodiments. Some first embodiments are directed at a method for graph-driven verification and debugging of an electronic design. In these embodiments, one or more design specifications are identified for generating a floorplan or a placement layout of an electronic design. Floorplanning or placement requirements are determined based in part or in whole upon pertinent electrical parasitics. The floorplan or the placement layout is generated at least by inserting a set of blocks based in part or in whole upon the floorplanning or placement requirements.

In some of these embodiments, a technology file is identified for the electronic design; and the floorplanning or placement requirements may be determined further in part upon the technology file. In some of these immediately preceding embodiments, electrical parasitics may be determined for at least a part of the electronic design at least by performing one or more electrical analyses based in part or in whole upon the one or more design specifications. The pertinent electrical parasitics may be extracted for the at least a part of the electronic design from the electrical parasitics. Derived electrical parasitics may be generated at least by deriving the derived electrical parasitics based in part or in whole upon the pertinent electrical parasitics and the one or more design specifications.

In some of the immediately preceding embodiments, one or more design for manufacturing (DFM) requirements may be determined based in part or in whole upon the one or more design specifications, the technology file, the pertinent electrical parasitics, and the derived electrical parasitics. A set of routing tracks or one or more track patterns may be identified into the floorplanning or placement requirements based in part or in whole upon the one or more DFM requirements and the one or more design specifications.

In addition or in the alternative, one or more blocks and one or more pins or ports thereof may be identified from the set of blocks; one or more corresponding locations may be determined for the one or more blocks in the floorplan or the placement layout based in part or in whole upon the floorplanning or placement requirements; and these one or more blocks may be inserted into the floorplan or placement layout at the one or more corresponding locations.

In some of these immediately preceding embodiments, routing requirements and routing options may be determined for the one or more pins or ports of the one or more blocks based in part or in whole upon the floorplanning or placement requirements; and the one or more pins or ports of the one or more blocks may be annotated or associated with the routing requirements and routing options.

In addition, a post-route layout may be generated at least by interconnecting the set of blocks in the floorplan or the placement layout based in part or in whole upon connectivity information, the routing requirements, and the routing options. A determination may be made to determine whether the floorplan, the placement layout, or the post-route layout meets the one or more design specifications and design for manufacturing requirements. One or more fixes may be performed on the floorplan, the placement layout, or the post-route layout when the floorplan, the placement layout, or the post-route layout is determined not to meet the one or more design specifications and the design for manufacturing requirements.

In some embodiments, one or more sensitivity analyses may be performed on the electronic design based in part or in whole upon at least some of the electrical parasitics. One or more blocks or block parameters thereof may be identified from the set of blocks that exhibit less significant impacts on compliance with the one or more design specifications based in part or in whole upon results of the one or more sensitivity analyses. The set of blocks may be reduced into a reduced set of blocks at least by ignoring the one or more blocks or block parameters from the set of blocks. In some of the immediately preceding embodiments, the pertinent electrical parasitics and the floorplanning or placement requirements may be determined only for the reduced set of blocks not for the one or more blocks.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing coplanar waveguide transmission lines in an electronic design are described below with reference to FIGS. 1A-5.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
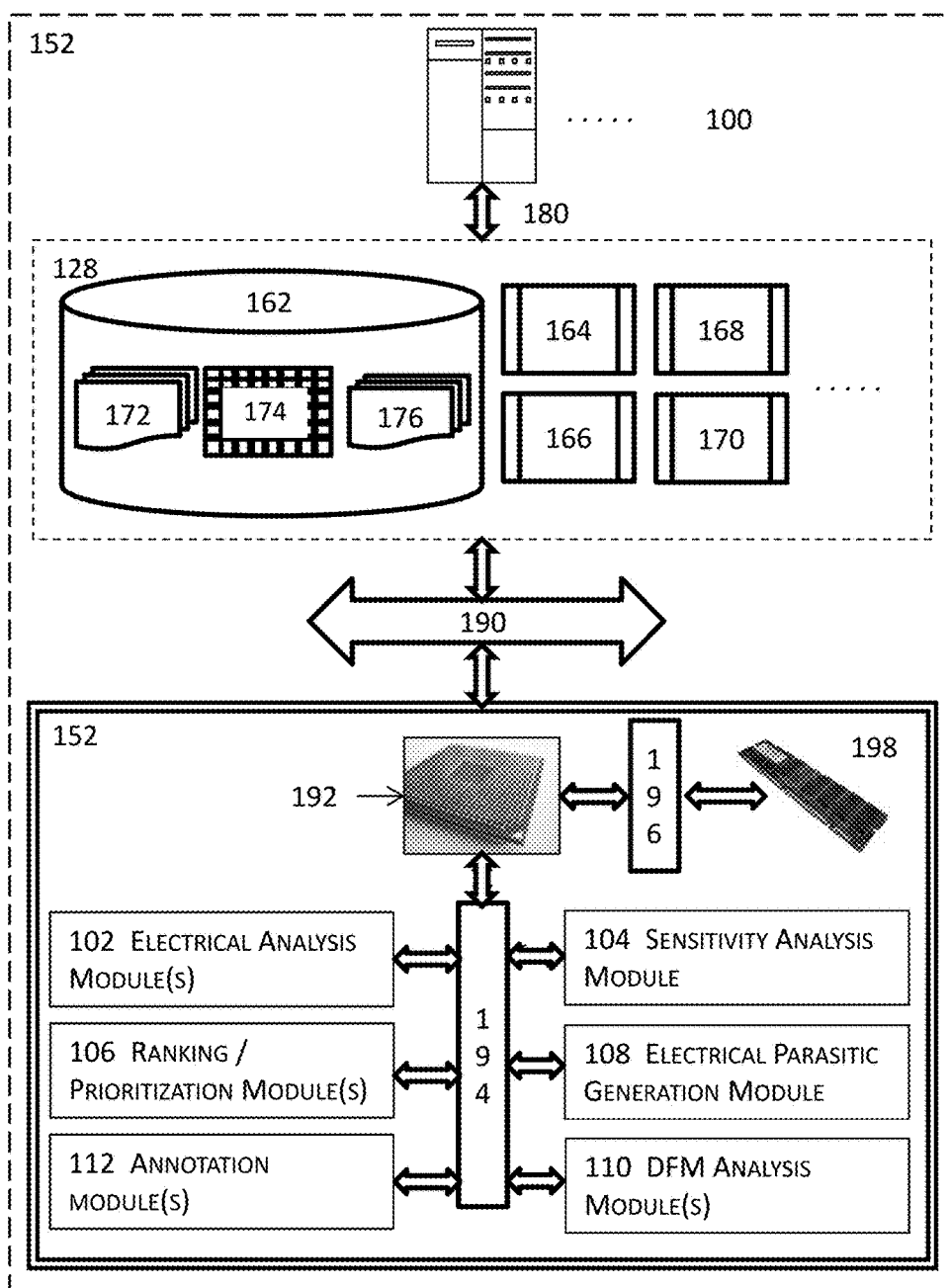
FIG. 1A illustrates a high level schematic block diagram for implementing a physical design of an electronic design with DFM and design specification awareness in one or more embodiments.

Various embodiments are directed to a method, system, and computer program product for implementing a physical design of an electronic design with DFM and design specification awareness. Other objects, features, and advantages of the invention are described in the detailed description, figures, and claims.

In various embodiments, various inputs including, for example, the design specification (e.g., the requirement specification, the electrical specification, the power specification, etc. for the electronic design), the technology file, etc. will be identified at a physical implementation tool such as a placement tool or a floorplanner for an electronic design including a plurality of cells, block, or blocks (collectively "blocks" for plural or "block" for singular) to be inserted into a floorplan or a placement layout. The blocks or block parameters thereof that may affect the compliance or non-compliance of the design specification may be optionally determined based on, for example, the results of one or more sensitivity analyses. These one or more sensitivity analyses examine all blocks or parameters thereof in an electronic design and identify only those blocks or parameters exhibiting more significant impacts while ignoring or discarding the remaining blocks or block parameters.

With these blocks or block parameters identified, electrical characteristics such as maximum or minimum electric currents and voltages pertaining to DFM requirements may be determined at least by performing one or more electrical analyses. These electrical characteristics may be used to derive the corresponding resistance values of various interconnects between the blocks although such interconnects have not been generated and are not the target of the floorplan or placement layout to be generated.

Various DFM requirements may then be generated based in part or in whole upon these electrical characteristics and the derived resistance values. For example, an electromigration (EM) requirement may be generated to limit the current density through a conductor with a desired or required mean-time-to-failure. When inserting a block into the floorplan or placement layout, the pins of the block are identified. The corresponding electrical characteristics may be associated with these pins, and routing tracks associated with respective width values may be selected based in part or in whole upon the corresponding electrical characteristics and the DFM requirements.

In this manner, a set of routing tracks or one or more sets of routing track patterns (or simply "track pattern" or "track patterns") may be determined from the manufacturing grids that are provided by a semiconductor fabrication foundry. This set of routing tracks or the one or more sets of routing track patterns may be used to insert the plurality of blocks into the floorplan or placement layout, where each routing track is associated with a width value so that an interconnect implemented along this routing track will assume or inherit the width value associated therewith. It shall be noted that routing tracks have zero-width value and are reference lines or line segments used to guide a routing engine to create interconnects along these routing tracks.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s).

Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1A-5.

Figure 2:
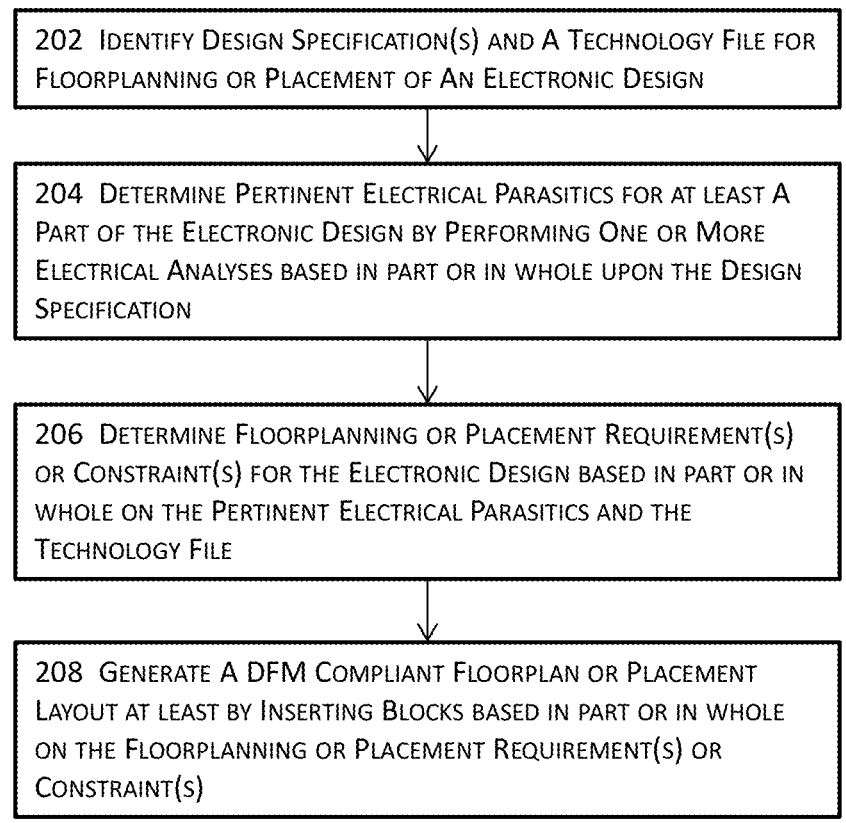
FIG. 2 illustrates a high level block diagram for implementing a physical design of an electronic design with DFM and design specification awareness in one or more embodiments.

FIG. 2 illustrates a high level block diagram for implementing a physical design of an electronic design with DFM and design specification awareness in one or more embodiments. When a layout engineer who may be unaware of or even completely lack the knowledge of the design specification or intent is to create a floorplan or a placement layout for an electronic design, one or more design specifications and a technology file may be identified at 202 at a physical implementation tool. In some of these embodiments, the floorplan or placement layout is a partial and incomplete floorplan or placement layout that does not even include all the blocks, cells, or circuit components in the electronic design until the completion of the floorplanning or placement process. Nevertheless, these techniques described herein still apply to such a partial and incomplete floorplan or placement layout while achieving the intended or desired purposes and functionalities. In some embodiments, the partial and incomplete floorplan or placement layout may even contain no circuit components at all, and these techniques described herein still apply with full and equal effects because these techniques prepare the floorplan or placement layout from the very beginning to ensure that each block, cell, or circuit component will be inserted while complying with the corresponding requirements.

These one or more design specifications are used to convey, to a designer, what is to be designed and may include, for example, a requirement specification, an electrical or power specification, etc. In some of these embodiments, a technology file including variability information of various circuit design components may also be identified at 202. The technology file may be subsequently referenced in the determination of floorplanning or placement options or the selection or identification of routing tracks or track patterns. More details about determining the floorplanning or placement options or identifying routing tracks or track patterns for floorplanning or placement with be described below with reference to FIGS. 3A-3C.

With these one or more design specifications identified, pertinent electrical parasitics may be determined at 204 at least by performing one or more electrical analyses or simulations while complying with various requirements in the one or more identified design specifications. These one or more electrical analyses or simulations may be performed based in whole or in part upon information in the one or more identified design specifications.

For example, a steady-state (e.g., a direct current or DC analysis) or transient (e.g., an alternating current or AC analysis) schematic simulation may be performed at 204 by using relevant electrical information (e.g., electric currents, voltages, etc.) and operating conditions (e.g., temperatures) from these one or more identified specifications to generate pertinent electrical parasitics. In some embodiments, the pertinent electrical parasitics such as the electric currents and voltages may be determined from the one or more electrical analyses. In some of these embodiments, at least some of the pertinent electrical parasitics may be derived from the results of electrical analyses. More details about deriving pertinent electrical parasitics are described below with reference to FIGS. 3A-3C.

In these embodiments illustrated in FIG. 2, the pertinent electrical parasitics are determined while the electronic design is constrained by and thus satisfies various requirements (e.g., operating frequency, buffer size, etc.) in the one or more design specifications. This compliance with design specifications ensures that a layout engineer cannot freely modify a physical design in subsequent physical implementation stages (e.g., floorplanning, placement, or routing) without complying with design specifications. For example, a layout engineer can no longer instruct an electro-migration aware router to widen the width of a wire without receiving an error if such a modification causes non-compliance of these one or more design specifications.

These techniques described herein are in sharp contrast with conventional approaches that fix EM violations, for example, by widening a wire to reduce current density, to reduce the operating frequency, to lower supply voltage, to shorten the interconnect, or to reduce the buffer size in clock lines. Although these conventional approaches may fix the EM violations, these fixes may nevertheless cause non-compliance with, for example, the operating frequency, etc. in the design specifications Although these aforementioned modifications may properly fix the EM violation during or after routing, they may nevertheless cause non-compliance with the design specification, whereas various techniques described create a DFM-compliance floorplan or placement layout while complying with the design specifications.

With the pertinent electrical parasitics determined, a set of floorplanning or placement requirements may be determined at 206 based in part or in whole upon the pertinent electrical parasitics and a technology file. A technology file includes variability information of various structures for a technology node and is usually provided by a foundry. For example, a technology file for 20-nanometer technology node may include ranges of values for the widths and the thicknesses of various circuit components (e.g., dielectric layer, routes, etc.).

With the variability information in the technology file and the pertinent electrical parasitics (e.g., the electric current and the resistance values), floorplanning or placement options including routing tracks or track patterns and one or more DFM requirements may be identified so that when a block having a pin is inserted into a floorplan or a placement layout, the pin may be aligned with a routing track associated with a width value (e.g., a nominal width value), and the interconnect connected to the pin may be subsequently implemented along this routing track while inheriting the associated width value. The techniques described herein select only the routing tracks or track patterns such that, given the resistance value determined at 204 for an estimated route, the minimum cross-sectional area derived from the variability information in the technology file will cause the current density (the pertinent electric current divided by the cross-sectional area) or the mean-time-to-failure derived therefrom for the estimated route to comply with the corresponding EM requirement.

In these embodiments, the floorplan or placement layout generated at 208 satisfies the DFM requirements by choosing the appropriate routing tracks for inserting blocks into a floorplan or a placement layout despite the fact that routes generation is not the target for floorplanning or placement. Because the one or more design specifications and technology file are already a part of the basis for determining the pertinent electrical parasitics, the generated floorplan or the placement layout also satisfies the one or more design specifications identified at 202 while accounting for variability of the fabrication processes as delineated in the technology file.

Figure 3A:
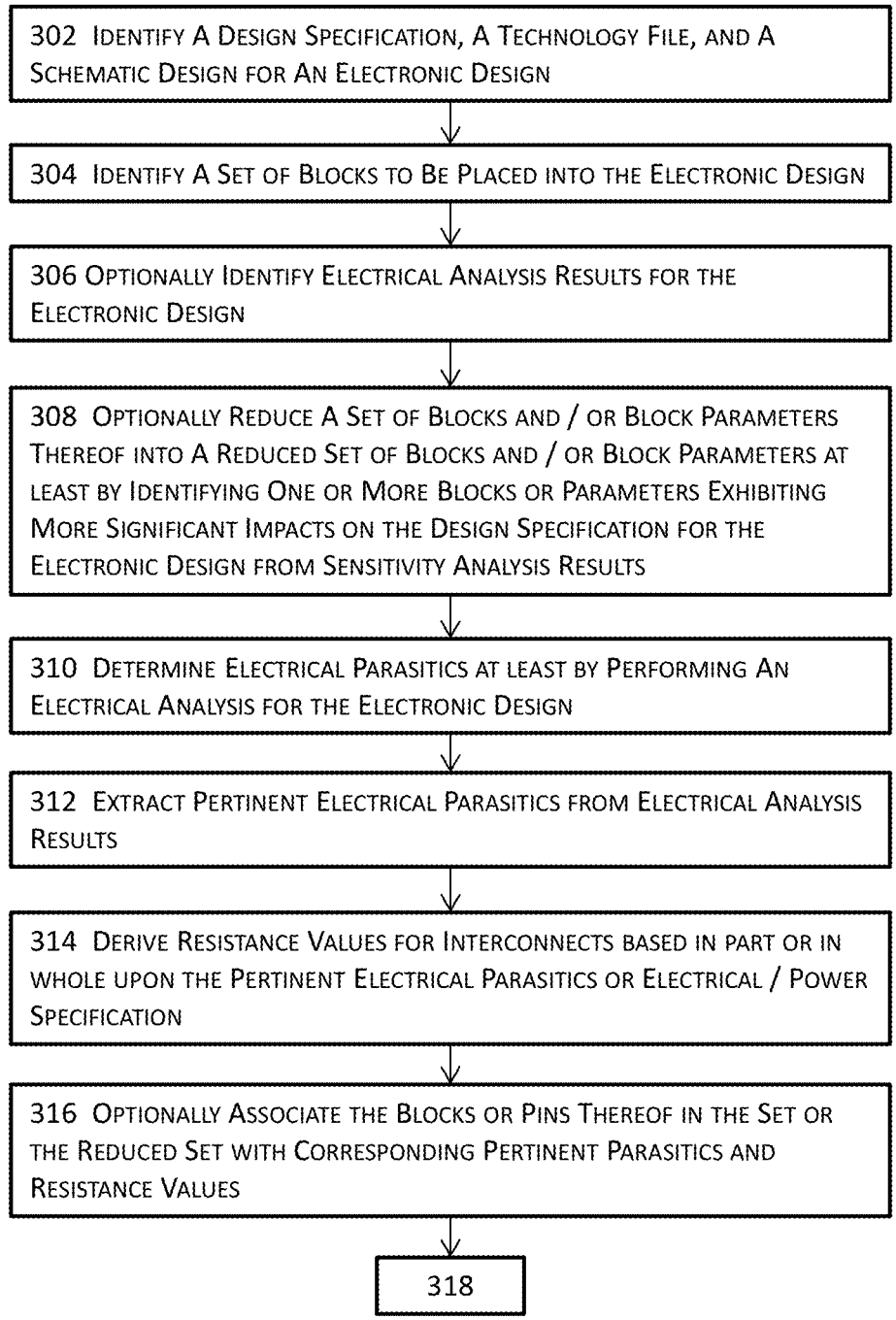
FIGS. 3A-3C jointly illustrate a more detailed block diagram for implementing a physical design of an electronic design with DFM and design specification awareness in one or more embodiments.
Figure 3B:
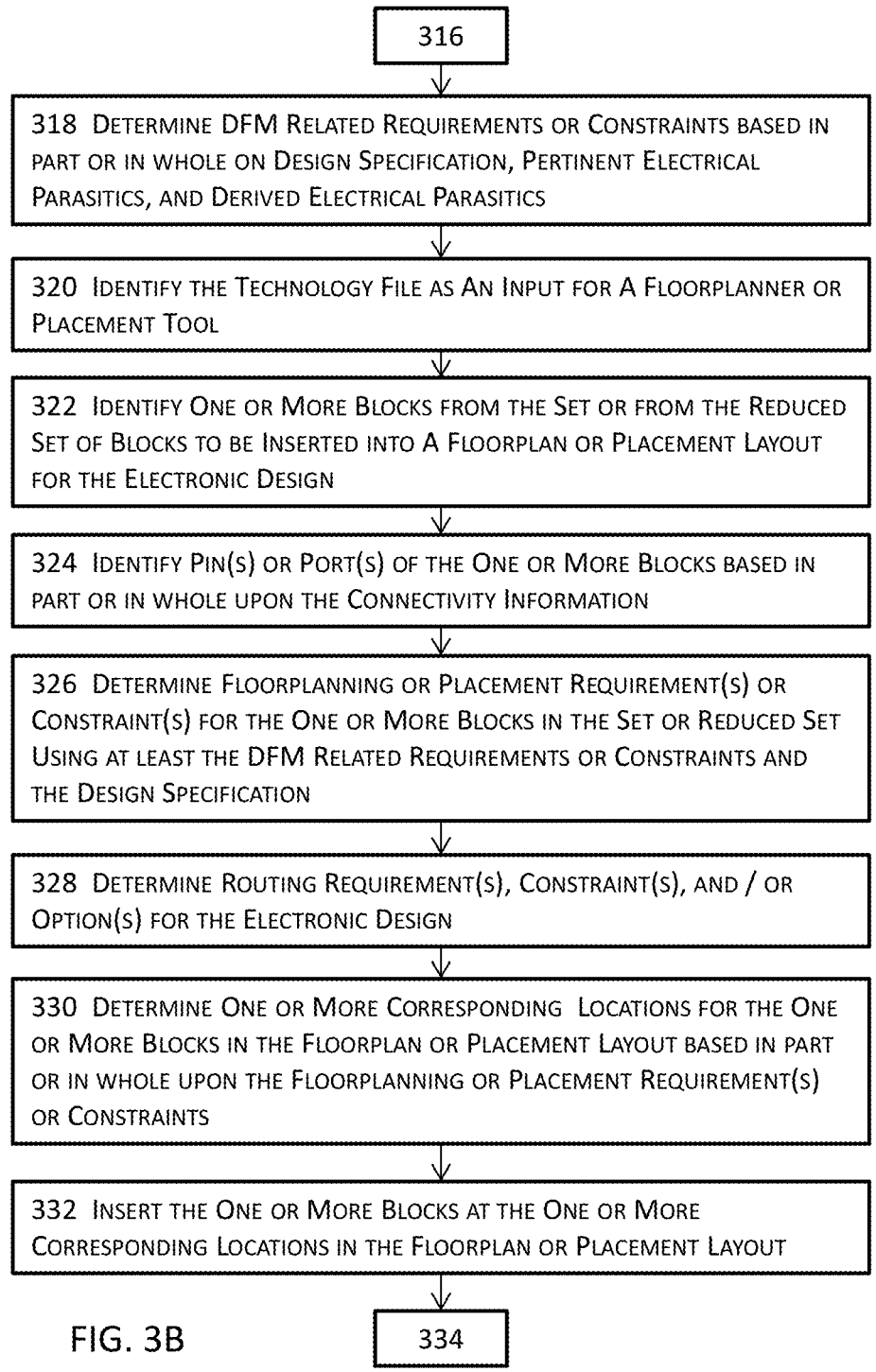
Figure 3C:
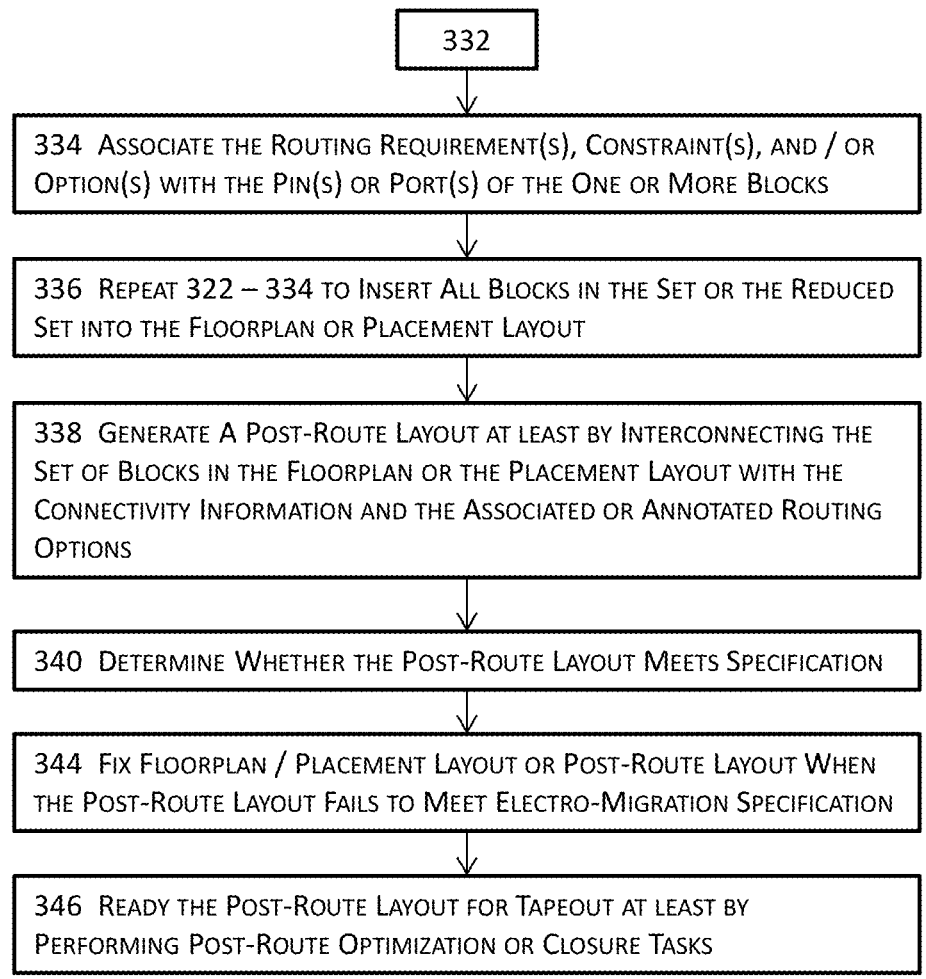

FIGS. 3A-3C jointly illustrate a more detailed block diagram for implementing a physical design of an electronic design with DFM and design specification awareness in one or more embodiments. One of the objectives of this more detailed block diagram is to generate a DFM-compliant floorplan or placement that also satisfies design specifications. In these embodiments, one or more design specifications, a technology file, and a schematic design may be identified at 302 for an electronic design.

These one or more design specifications may include, for example, a requirement specification that generally includes the information about various performance, manufacturability, or reliability requirements to be satisfied by the materials, the design, the operation conditions (e.g., frequencies, input voltages and currents or ranges thereof, output voltages and currents or ranges thereof, etc.), and/or the eventual electronic circuit. For example, the design specification may include one or more electro-migration requirements that specify the mean-time-to-failure (MTTF) at one or more reference temperatures, the maximum electric current densities, or any other suitable information. A requirement specification may also include functional overview or one or more functional block diagrams describing major blocks and interfaces thereof as well as the internal functionality of the electronic design for the underlying electronic design in some embodiments.

One or more other specifications such as an electrical specification or a power specification may also be included in the one or more design specifications to convey the power intent and various other pieces of information about electrical and power characteristics of the electronic design. In some embodiments, these one or more design specifications may further include information about how the electronic design fits in a larger system as well as the functions of the electronic design for the larger system.

A set of blocks or parameters thereof to be placed into a floorplan or a placement layout may be identified at 304. This identified set of blocks or parameters thereof may include cells, blocks, devices, and discrete circuit components that are the targets of floorplanning or placement. The set of blocks includes all the electronic design components less the interconnections to be inserted into the floorplan or the placement layout. In some embodiments, the block diagram illustrated in FIGS. 3A-3C may skip 306 and 308 to perform the tasks from 310 and on. In some other embodiments, this set of blocks or parameters thereof may be optionally reduced at least by optionally identifying electrical analysis results for the electronic design at 306. For example, steady-state or transient electrical simulation results at the schematic level may be identified. These electrical analysis results may include electrical parasitics such as information about electric currents, capacitances, and inductances, etc.

The set of blocks or parameters thereof identified at 304 may then be optionally reduced to a reduced set of blocks or parameters thereof at 308 at least by identifying one or more blocks or parameters that exhibit more significant impacts on the one or more design specifications for the electronic design. In some embodiments, one or more sensitivity analyses may be performed to identify these one or more blocks or parameters. A sensitivity analysis determines how the behavior (e.g., output signals) of an electronic design is apportioned, qualitatively and/or quantitatively, to different cells, blocks, devices, circuit components, or parameters thereof. Sensitivity analysis results may be used to determine and improve robustness of the electronic design by identifying and spending more engineering efforts on more sensitive cells, blocks, circuit components, or parameters thereof. Various sensitivity analysis techniques such as a regression analysis, variance-based methodologies, Fourier amplitude sensitivity test, response surface methodologies, or Monte Carlo filtering techniques, or any other suitable techniques, etc. may be used in performing these one or more sensitivity analyses.

At 306 and 308, the devices or parameters that exhibit or are more likely to exhibit more significant impacts on the compliance (or non-compliance) with the one or more design specifications are identified while devices or parameters that exhibit or are more likely to exhibit less significant impacts on the compliance (or non-compliance) with the one or more design specifications are discarded or ignored. This reduction of a set of blocks or parameters into a reduced set conserves computational resources such as memory footprint and runtime due to a fewer number of process.

Electrical parasitics may be determined at 310 at least by performing one or more electrical analyses for the electronic design. For example, a steady-state or transient schematic simulation may be performed at the schematic level. Electrical analyses such as schematic level simulations are often performed at the schematic level to characterize circuit behaviors at an early stage of the electronic design cycle to improve design efficiency by revealing faulty designs earlier. Nonetheless, not all schematic level electrical analyses provide the desired or required output for various techniques described herein.

For example, when determining a reduced set of blocks or parameters exhibiting more significant impacts on compliance or non-compliance with the design specifications by performing one or more sensitivity analyses at 308, this reduced set of blocks may be determined by using electrical parasitics from a schematic simulation in a sensitivity analysis. These electrical parasitics may include, for example, information about electric currents, capacitances, etc. but may not necessarily include the desired or required electrical parasitics for subsequent operations illustrated in FIGS. 3A-3C. For example, an electro-migration analysis may need the maximum current density and hence the maximum electric current information that is not necessarily a target of common schematic electrical simulations.

In some embodiments where the reduced set of blocks is determined at 308, and the electrical analysis results include the desired or required electrical parasitics for subsequent operations, these one or more electrical analyses may be skipped, and the electrical parasitics may be determined at 310 from the previous results of electrical analyses. In some other embodiments where no previous electrical analysis results are available, the electrical parasitics may be determined at 310 anew at least by performing one or more electrical analyses.

At 312, pertinent electrical parasitics may be extracted from the electrical analysis results. For example, maximum and/or minimum electrical currents, capacitances, etc. may be extracted or retrieved from the electrical analysis results. In some embodiments where transient electrical analyses are performed, transient electrical parasitics such as electric currents over time, capacitances over time, etc. may be extracted. For example, an electrical analysis module 102 may perform one or more steady-state or transient electrical simulations to determine pertinent electrical characteristics (e.g., maximum or minimum electric currents, voltages, etc.) pertaining to an electro-migration requirement. It shall be noted that although some embodiments refer to electro-migration requirements or electro-migration, various techniques described herein apply with full and equal effects to other types of DFM requirements.

In order to meet certain DFM requirements, some additional electrical parasitics may be derived or determined at 314 from, for example, the electrical parasitics from electrical analyses such that when the set of blocks or the reduced set of block is inserted into the floorplan or placement layout, the floorplan or the placement layout satisfies both the DFM requirements and the design specifications.

For example, when a design specification provides the operating frequency ($\omega$) on a net, the resistance value (R) for the net may be derived by using the electric current (I(t), where t denotes time) and voltage (V(t), where t denotes time) information from electrical analyses. In this example, $V(t)=I(t)\times R$ from Ohm's law, and $V(t)=V\times\sin(\omega t)$ from the voltage signal expression. It may be derived that the ratio of AC voltage to AC current across a resistor, R, may be expressed as $R=V(t)/I(t)=V\times\sin(\omega t)/I\times\sin(\omega t)$, where the AC voltage is assumed to lead the AC current by 0 degrees.

For a capacitor having capacitance C, it may be derived that $I(t)=C\times dV(t)/dt$. With $V(t)=V\times\sin(\omega t)$, it may be further derived that $dV(t)/dt=\omega\times V\times\cos(\omega t)$. Therefore, $V(t)/I(t)=V\times\sin(\omega t)/\omega\times V\times C\times\cos(\omega t)=\sin(\omega t)/\{\omega\times C\times\sin(\omega t+\pi/2)\}$, where $\omega$ denotes the operating frequency, and t denotes time. The impedance ($Z_{capacitor}$) of the capacitor may be expressed as $\exp(-j\times\pi/2)/(\omega\times C)$. From Euler's formula, $Z_{capacitor}=-j/(\omega\times C)=1/(j\times\omega\times C)$. For an inductor, the impedance ($Z_{indcutor}$) of the capacitor may be expressed as $Z_{indcutor}=\omega\times L\times\exp(j\times\pi/2)=j\times w\times L$.

In some embodiments where the operating frequency is not available for a net, the DC current (e.g., from the DC design specification or from the electrical specification for power consumption) may be used to derive the minimum and/or maximum resistance for the net. In some other embodiments where both the operating frequency and the DC current are not available, the AC current form, for example, an AC transient design specification including information such as gain, frequency, bandwidth, etc. may be used to derive the maximum and minimum resistance value of a net.

This derived resistance value of a net connected to pins of blocks may be used to constrain the identification or selection of a routing track that is further associated with a width value so that the selected routing track for the net provides the electrical parasitics or approximations thereof to satisfy the DFM requirements while observing the design specifications. For example, these DFM requirements may include an electro-migration requirement associated with a node (e.g., a pin or a port) of a block. This electro-migration requirement may be used to guide the selection of a track or a track pattern from, for example, the manufacturing grids and hence the determination of the location and orientation for the node of the block such that an interconnect connected to the node may be implemented by a routing module while automatically satisfying the electro-migration requirement. More details will be described in subsequent paragraphs with reference to 318 through 328.

The set of blocks or pins in the set or the reduced set of blocks may then be optionally associated or annotated at 316 with their respective pertinent electrical parasitics (e.g., electric currents, voltages, etc.) and derived electrical parasitics (e.g., resistance values) in some embodiments. In some of these embodiments, the association or annotation may be done by storing the pertinent and derived electrical parasitics in a data structure and further by providing links between the blocks or pins and their corresponding parasitics.

For example, an annotation module 112 may annotate or associate various electrical characteristics or parasitics such as electric currents, current densities, voltages, resistances, inductances, etc. with a node or a boundary of a block. Other information or data may also be annotated or associated with the corresponding pins, ports, blocks, or boundaries thereof. For example, an annotation module 112 may annotate or associate one or more absolute or relative locations with a node or a boundary of a block for inserting the block into a floorplan or a placement layout. As another example, an annotation module 112 may annotate or associate one or more routing options with a node or a boundary of a block for implementing an interconnect connected to the node or the boundary of the block. As another example, an annotation module 112 may annotate or associate multiple width values or multiple numbers of tracks with a node for implementing an interconnect connected to the node. An annotation module 112 may annotate or associate one or more DFM requirements with a node or a boundary of a block to ensure that the block may be implemented in the floorplan or placement layout while satisfying these one or more DFM requirements.

DFM related requirements may be determined at 318 based in part or in whole upon the design specifications identified at 302, the pertinent electrical parasitics (e.g., electric currents, voltages, etc.) extracted or retrieved at 312, and derived electrical parasitics (e.g., resistances) derived or determined at 314. In some of these embodiments, one or more of these DFM related requirements may be determined based further in part or in whole upon the technology file for this technology node (e., 14-nanometer technology node). For example, an EM requirement may be determined at 318 based on the Black equation for an interconnect:

$$\text{MTTF}=A\times(J^{-n})\times\exp(E_a/kT), \quad (1)$$

In the Black's equation, MTTF denotes the mean-time-to-failure; A denotes a constant based on the cross-sectional area of the interconnect; J denotes the current density through the interconnect; Ea denotes the activation energy for the material of the interconnect; k denotes the Boltzmann's constant; T denotes temperature; and n denotes a scaling factor that may be set to 2 in some embodiments. The EM requirement may specify, for example, the required or desired mean-time-to-failure, the maximum current density, etc. in some embodiments. These DFM requirements identified at 318 may be associated or annotated with the corresponding nodes or boundary of the set or the reduced set of blocks.

A technology file for the technology node (e.g., 10-nanometer technology node) may be identified at 320 as an input to a floorplanner or a placement module. As described above, a technology file includes variability information of various structures for a technology node. The floorplanner or placement module may reference this technology file during floorplanning or placement of the set of blocks into the floorplan or the placement layout. For example, the floorplanner or the placement module may reference the technology in selecting or identifying the floorplanning or placement options or requirements. More details about the selection or identification of floorplanning or placement options or requirements will be described below with reference to 326.

With various pieces of data or information gathered as described with respect to 302 through 320, a floorplan or a placement layout may be created by inserting the set of blocks of the electronic design into the floorplan or the placement layout. One or more blocks may be identified at 322 from the set or the reduced set of blocks. In some embodiments, these one or more blocks may be first identified from the reduced set of blocks because of their relatively higher sensitivity for the compliance (or non-compliance) with the design specifications. For each of these one or more blocks, one or more pins or ports (e.g., input and output pins or ports) may be identified at 324 based in part or in whole upon the connectivity information that includes how each pin or port of a block is connected in the electronic design.

With these pins or blocks identified, floorplanning or placement requirements or options may be determined at 326. The floorplanning or placement requirements or options may include, for example, routing tracks or track patterns along which specific locations (and hence orientation) of blocks may be determined such that a pin of a block may be aligned with one of the routing tracks when the block is inserted into the floorplan or the placement layout. In identifying one or more routing tracks as the floorplanning or placement requirements or options for a pin of a block, the width values associated with routing tracks are examined.

Certain techniques and modules described herein (e.g., the DFM analysis module 110, the electrical parasitic generation module 108, etc.) may check these width values while referencing the variability information in the technology file as well as the DFM requirements and corresponding electrical parasitics to determine whether align a pin of a block with a routing track satisfies the DFM requirements and hence the design specifications that are a part of the basis for the determination of the DFM requirements and the electrical parasitics.

For example, when identifying a routing track form the manufacturing grids or a set of routing tracks, the width value associated with the routing track may be examined with reference to the corresponding variability information for an interconnect having the width value in the technology file. The variability may provide, for example, the minimum thickness value and the minimum width value for this interconnect so that the minimum cross-sectional area may be determined for this interconnect when implemented along this routing track.

The electrical parasitic such as the maximum electric current associated with the pin may be identified to compute the current density for this pin when aligned with the routing track. This current density may be compared to the associated EM requirement to determine whether this particular routing track may be used to place the block so that aligning the pin with the routing track creates a legal floorplan or placement layout while satisfying the DFM requirements and the design specifications.

It shall be noted that the aforementioned example is provided to describe various interactions between different modules described here and how a routing track may be selected in some embodiments. In some other embodiments, candidate routing tracks associated with appropriate width values may be precomputed for various pins and stored in a data structure (e.g., a lookup table, a database, etc.) for more efficient selection or identification of routing tracks due to a limited number of pins and limited number of routing tracks associated with different width values.

In addition to selecting the routing tracks associated with the appropriate width values, the routing track identification may be subject to another constraint—the spacing between the pins of a block. Various techniques described herein may also factor the spacing values between pins and ports in the identification of routing tracks or track patterns for inserting one or more blocks into a floorplan or a placement layout. A track pattern includes a plurality of routing tracks at one or more spacing values, and each of the plurality of routing tracks is associated with a width value that is inherited by an interconnect implemented along the routing track.

In some embodiments, the floorplanning or placement requirements or options may be determined on a block-by-block basis. In these embodiments, the floorplanning or placement requirements or options are determined as a block is inserted into the floorplan or the placement layout. In some other embodiments, the floorplanning or placement requirements or options are determined for a plurality of blocks. In these embodiments, the plurality of blocks may be first identified at 322, and the floorplanning or placement requirements or options are determined to accommodate all the plurality of blocks. In some of these embodiments, all blocks in the set of blocks of an electronic design are identified at 322, and the floorplanning or placement requirements or options are determined for all these blocks in the set at once prior to inserting these blocks into the floorplan or placement layout.

One or more routing requirements or options may also be determined at 328 for these identified pins or ports of the one or more blocks identified at 322 for the electronic design. These routing requirements or options may include, for example, a number of tracks, whether wrong-way routing (e.g., routing in the non-preferred routing direction) is permitted for certain layers, various design rules such as parallel run length rules, spacing rules, via insertion rules, via cut size rules, etc., or any other required or desired requirements or options that may be used to guide a routing module to create topological routes between the inserted blocks.

One or more corresponding locations for the one or more identified blocks may be determined at 330. In some embodiments, these one or more locations may be determined based in part or in whole upon the floorplanning or placement requirements. For example, the floorplanner or placement module may be determined by selecting the routing tracks at appropriate spacing values on the current routing layer and optionally on an immediate neighboring routing layer from the floorplanning or placement requirements.

Multiple locations may be determined for a block, especially for blocks that are inserted during the early stage of floorplanning or placement because the floorplan or the placement layout has none or fewer blocks at the early stage and thus imposes fewer constraints on these blocks. With multiple locations, a block may nevertheless be inserted at one of the multiple locations at 332 while the remaining locations may be associated with the block as placement options in some embodiments. If only one location is determined for a block, the block may be inserted at this only location in the floorplan or placement layout at 332.

The block inserted at any of these multiple locations and the subsequent post-route layout automatically satisfy the DFM requirements and the design specifications. As a practical working example, when the electrical characteristics at a pin of the block are known, the resistance value of an interconnect connected at the pin may be estimated by using non-topological route estimate (e.g., global route) or by using the sum of Manhattan distances between this pin and the other interconnected pin based on the connectivity information. In addition, the resistance value of the interconnect may also be derived from the electrical characteristics as described above with reference to 314.

With the derived resistance value for the estimated interconnect, the minimum cross-section area of this interconnect may be determined based on the variability information in a technology file and a DFM requirement (e.g., an electromigration requirement). A routing track associated with an appropriate width value may thus be selected to place the block such that the pin of the block is aligned with the routing track when the block is inserted into the floorplan or placement layout and to provide sufficient cross-sectional area to maintain the DFM requirement as well as the design specification (e.g., the operating frequency). The floorplan or the placement layout thus created automatically satisfies various DFM requirements as well as the design specification and thus eliminates or reduces more costly post-placement or even post-route fixing of DFM violations.

These one or more routing requirements or options may also be associated or annotated with the one or more pins or with the boundaries of these one or more blocks at 334 in some embodiments. The operations from 322 to 334 may be repeated at 336 until all the blocks in the set of blocks of the electronic design are inserted into the floorplan or placement layout. This floorplan or placement layout may then be forwarded to a routing module that generates a post-route layout at least by interconnecting the set of blocks with reference to the connectivity information at 338.

As another practical working example illustrating that the floorplan or placement layout automatically complies with an EM requirement, a schematic simulation may be performed by using information about the input voltages and electric currents of the electronic design to compute the maximum, minimum, average, or root mean square (RMS) electric current and voltage value at a node of a block of circuit components. Although no detail routes available during floorplanning or placement, the connectivity information in or associated with the schematic design may indicate how and where this node is connected. The maximum, minimum, or average resistance value of a non-topological wire connected to the node may thus be estimated or derived from the electric current and the capacitance.

It shall be noted that these resistance values are estimated or derived based on and thus comply with the design specifications. Further, because each routing track is associated with its respective width value, one or more routing tracks with appropriate associated width values may be identified such that the cross-sectional areas of these interconnects, when combined with the maximum electric current from the electrical analyses, will satisfy the EM requirement. These techniques thus generate a floorplan or placement layout that complies with both the design specifications and DFM requirements.

Although routing is not a native capability of a floorplanner or a placement module, these techniques described herein associate or annotate the routing options with pins, ports, blocks, or boundaries thereof. These annotations or associations are generated based at least in part upon the design specifications and DFM requirements. As a result, a routing module, when guided by these annotations or associations, automatically creates a post-route layout that also complies with the design specifications and DFM requirements.

At 340, verification or validation tasks may be performed to determine whether the post-route layout complies with the design specifications. If it is determined that the post-route layout fails to comply with the design specifications, one or more fixes may be applied at 344 to the post-route layout if the non-compliance is caused by interconnections. If it is determined that the floorplan or placement layout fails to comply with the design specifications, one or more fixes may be applied at 344 to the floorplan or placement layout if the non-compliance is caused by floorplanning or placement. In some embodiments, various techniques generate a correct-by-construction floorplan or placement layout that complies with all the design specifications as well as DFM requirements that are used in guiding the floorplanner or placement module in generating the floorplan or placement layout. The post-route layout may be readied for tapeout at least by performing post-route optimizations or various closure or signoff tasks (e.g., timing closure, design closure, etc.) at 346.

Figure 4A:
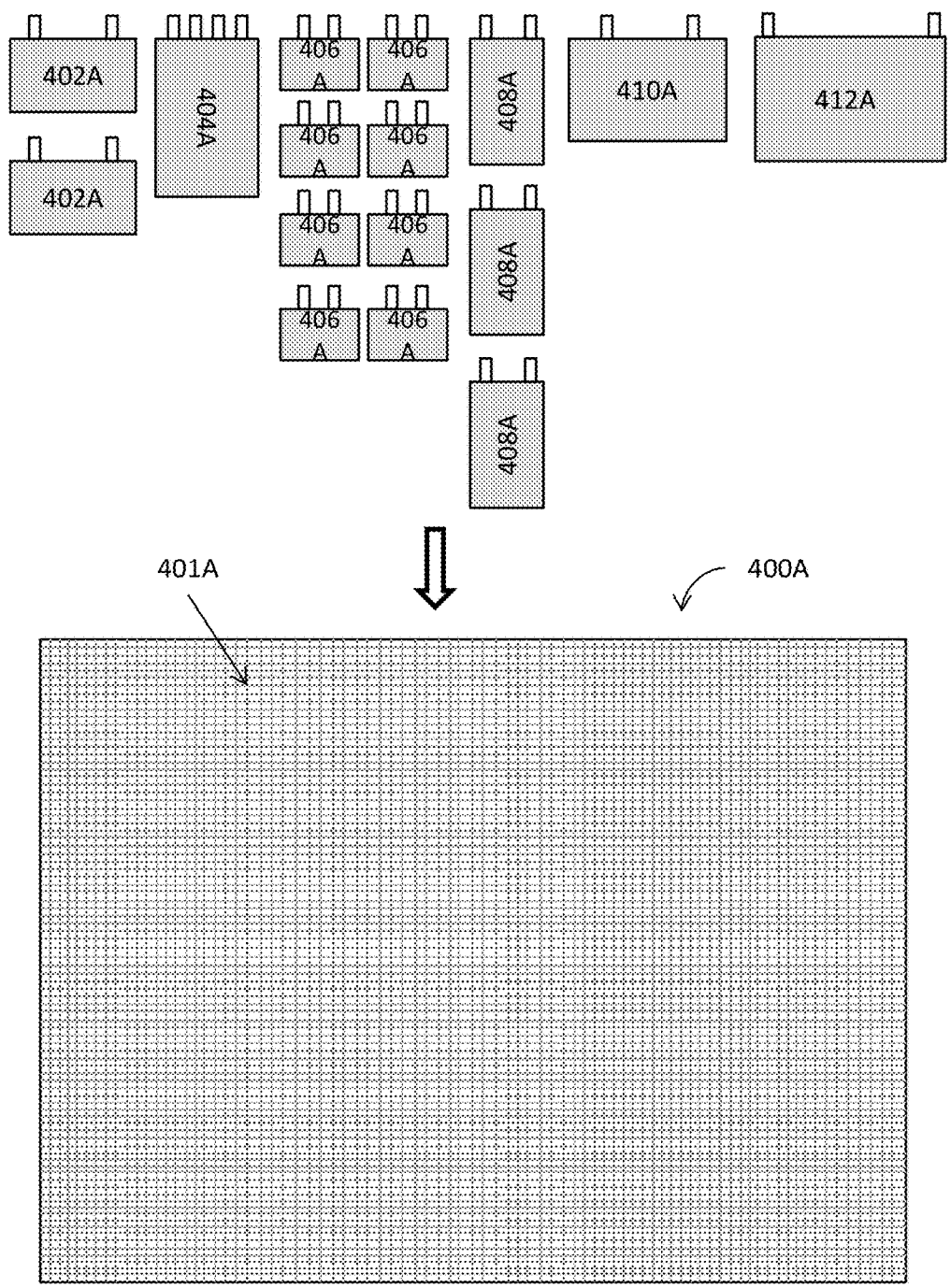
FIGS. 4A-4G jointly illustrate an example of implementing a DFM compliant floorplan or a placement layout with various techniques described herein in one or more embodiments.

FIGS. 4A-4G jointly illustrate an example of implementing a DFM compliant floorplan or a placement layout with various techniques described herein in one or more embodiments. More specifically, FIG. 4A illustrates a set of blocks (402A, 404A, 406A, 408A, 410A, and 412A) are to be inserted to the canvas 400A of a floorplan or a placement layout. Each block, when inserted, may be instantiated as an instance of the corresponding master block. The canvas 400A of the floorplan or the placement layout may be associated with manufacturing grids 401A that are usually provided by a foundry. Routing tracks may be defined from these manufacturing grids that are typically spaced at merely one or a few nanometers apart and are thus much denser than routing tracks.

Figure 4B:
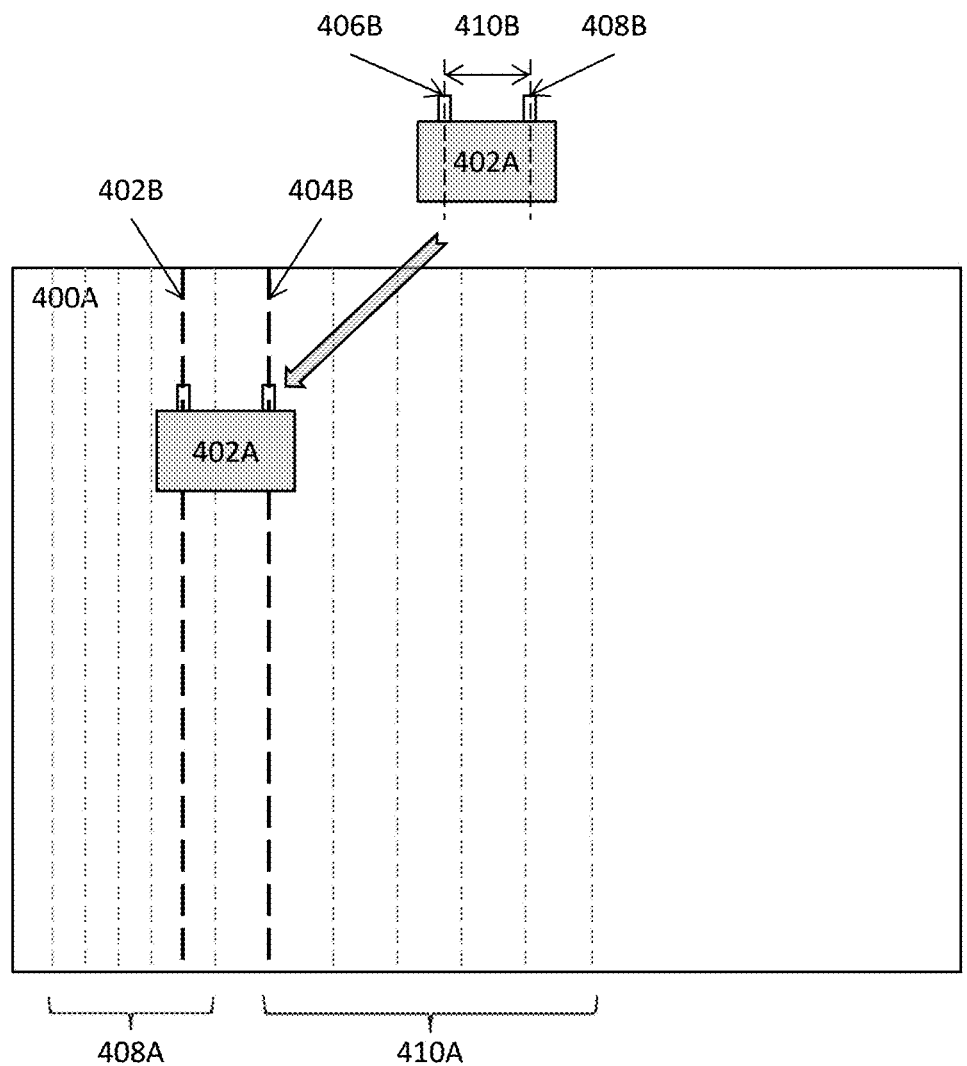

FIG. 4B illustrates an example of inserting a block 402A (or an instance thereof) into the canvas. For the ease of illustration and description, the block 402A has two pins 406B and 408B that are spaced apart at the spacing 410B. As described above with reference to FIGS. 2 and 3A-3C, the electrical parasitics and one or more DFM requirements may be determined and associated (or annotated) with the pins 406B and 408B. One or more floorplanning or placement options may also be associated or annotated with the pins (or the block or the boundary thereof).

A floorplanner or placement module may reference these one or more floorplanning or placement options to select routing track 402B from track pattern 408A and routing track 404B from track pattern 410A. Each of these two routing tracks is associated with an appropriate width value such that the interconnects connected to these two pins not only satisfy the DFM requirements but also the design specifications. The block 402A may thus be inserted into the canvas at a designated location, while the other candidate locations may also be associated or annotated with the block 402A so that block 402A may move among these candidate locations to improve or optimize the floorplan or placement layout as more blocks are inserted.

Figure 4C:
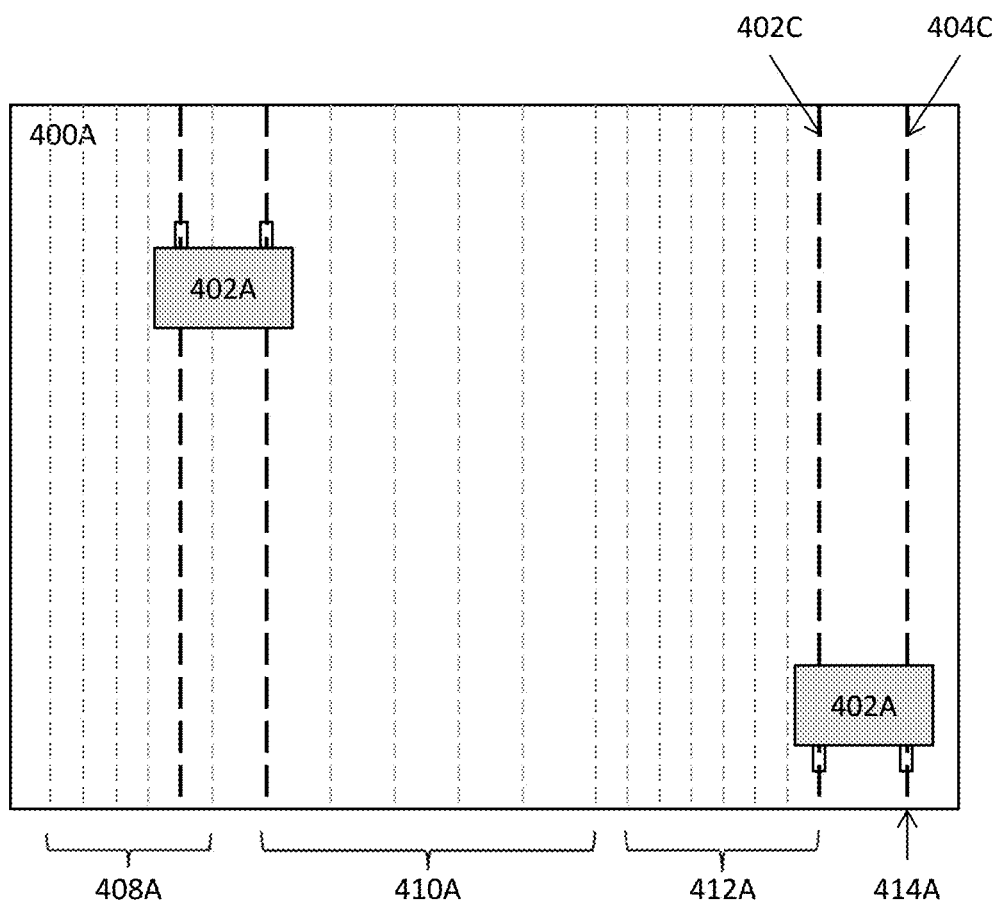

FIG. 4C illustrates the insertion of another instance of block 402A into the floorplan or placement layout. In this example, various techniques described herein identifies routing track 402C from track pattern 412A and routing track 404C from track pattern 414A having only one routing track (404C). The floorplanner or the placement tool may rotate this second instance of block 402A by 180 degrees from the orientation of the first instance of block 402A based in part or in whole upon, for example, one or more routing options associated with the second instance of block 402A although routing is not a native functionality of a floorplanner or placement module.

Figure 4D:
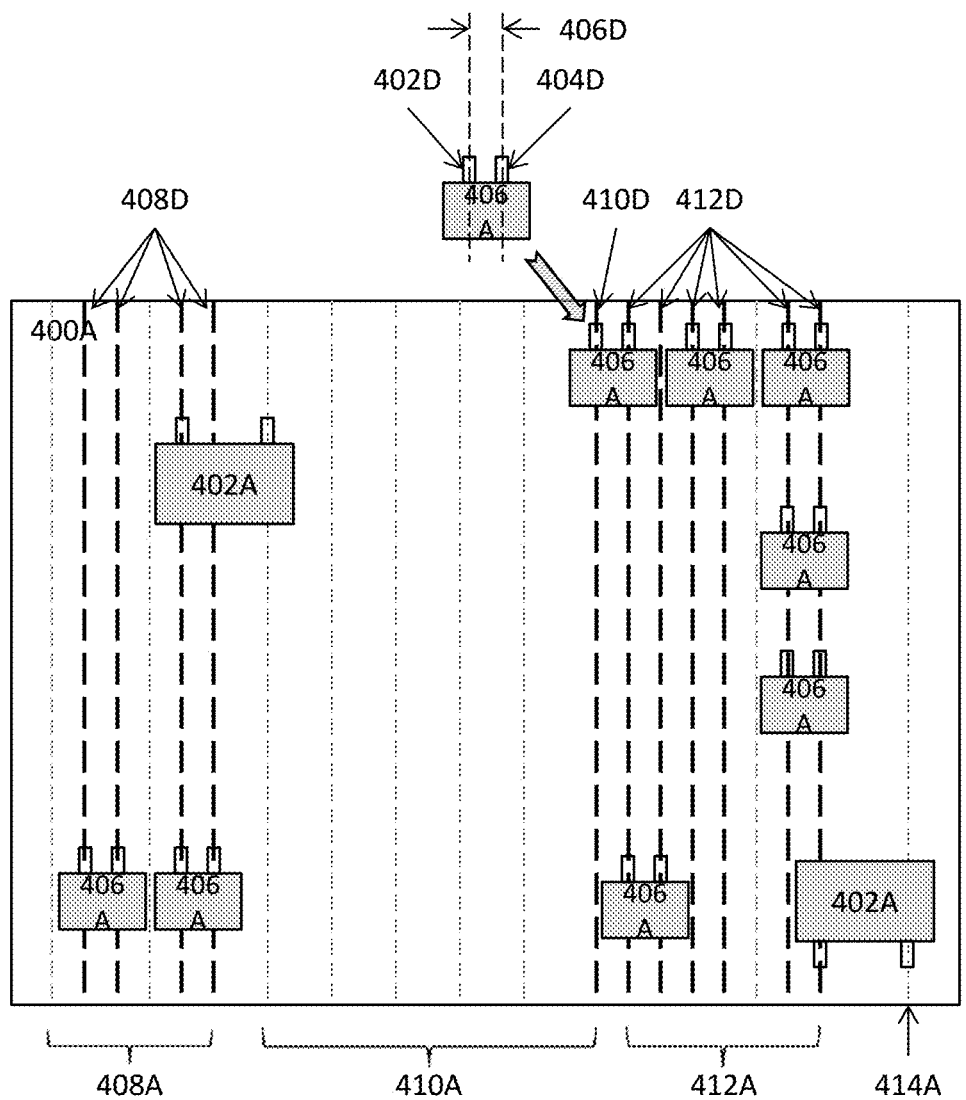

FIG. 4D illustrates inserting various instances of block 406A into the floorplan or placement layout. For the ease of illustration and description, the block 406A has two pins 402D and 404D that are spaced apart at the spacing 406D. Various routing tracks (408D, 410D, and 412D) are selected by using identical or substantially similar techniques described above for inserting instances of blocks 402A. Respective locations are determined for these eight instances of block 406A while satisfying various DFM requirements as well as design specifications. In FIGS. 4A-4G, the routing tracks 408D, 410D, and 412D graphically represented with a heavier line width indicate the identified routing tracks for inserting these instances into the floorplan or placement layout although routing tracks are merely reference lines or line segments with zero-width.

Figure 4E:
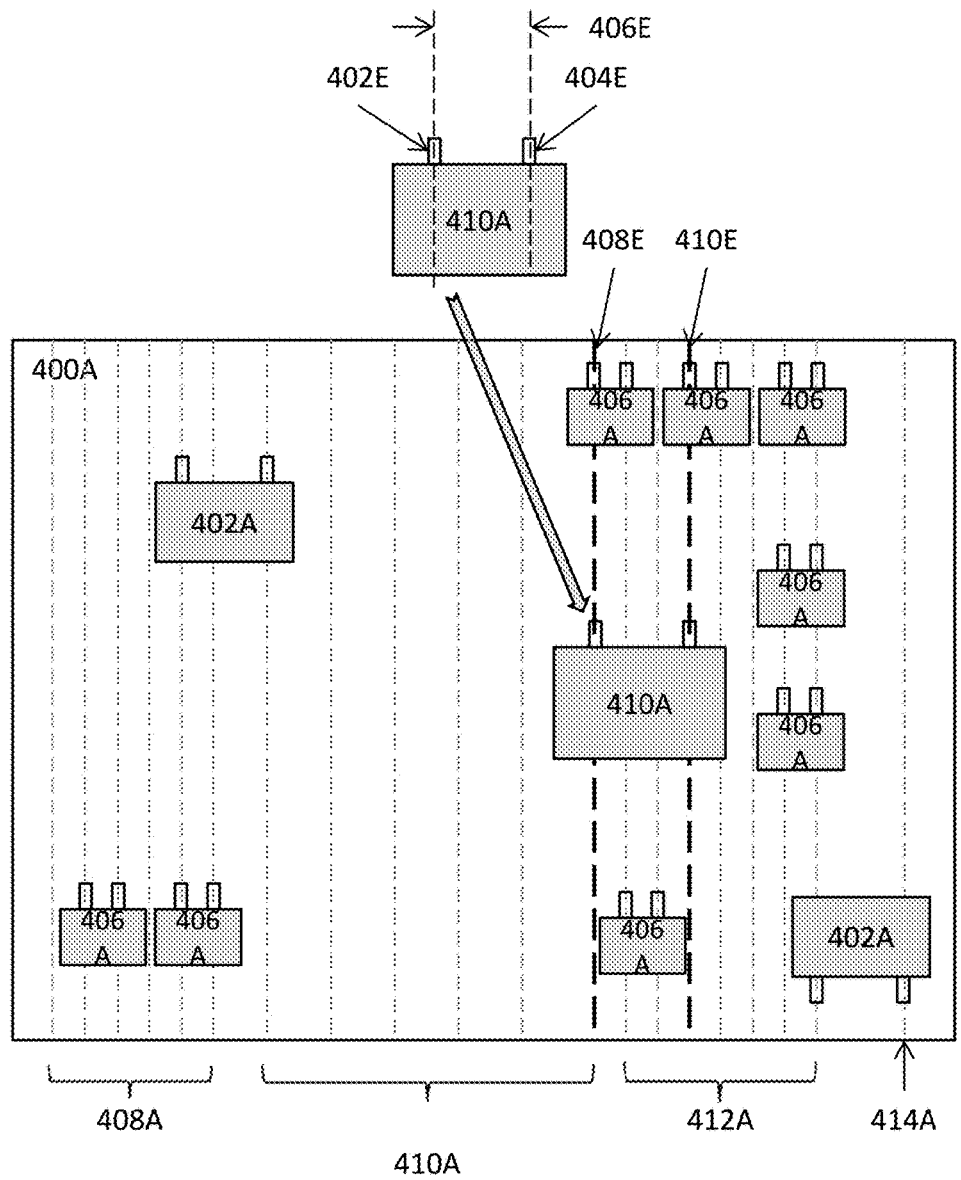

FIG. 4E illustrates inserting an instance of block 410A. For the ease of illustration and description, the block 410A has two pins 402E and 404E that are spaced apart at the spacing 406E. Two routing tracks (408E and 410E) are selected by using identical or substantially similar techniques described above for inserting the instance of blocks 410A. When interconnects are created by a routing module to connect to pins 402E and 404E, these two interconnects inherit the width values respectively associated with routing tracks 408E and 410E. One or more locations are determined for this instance of block 410A while satisfying various DFM requirements as well as design specifications.

Figure 4F:
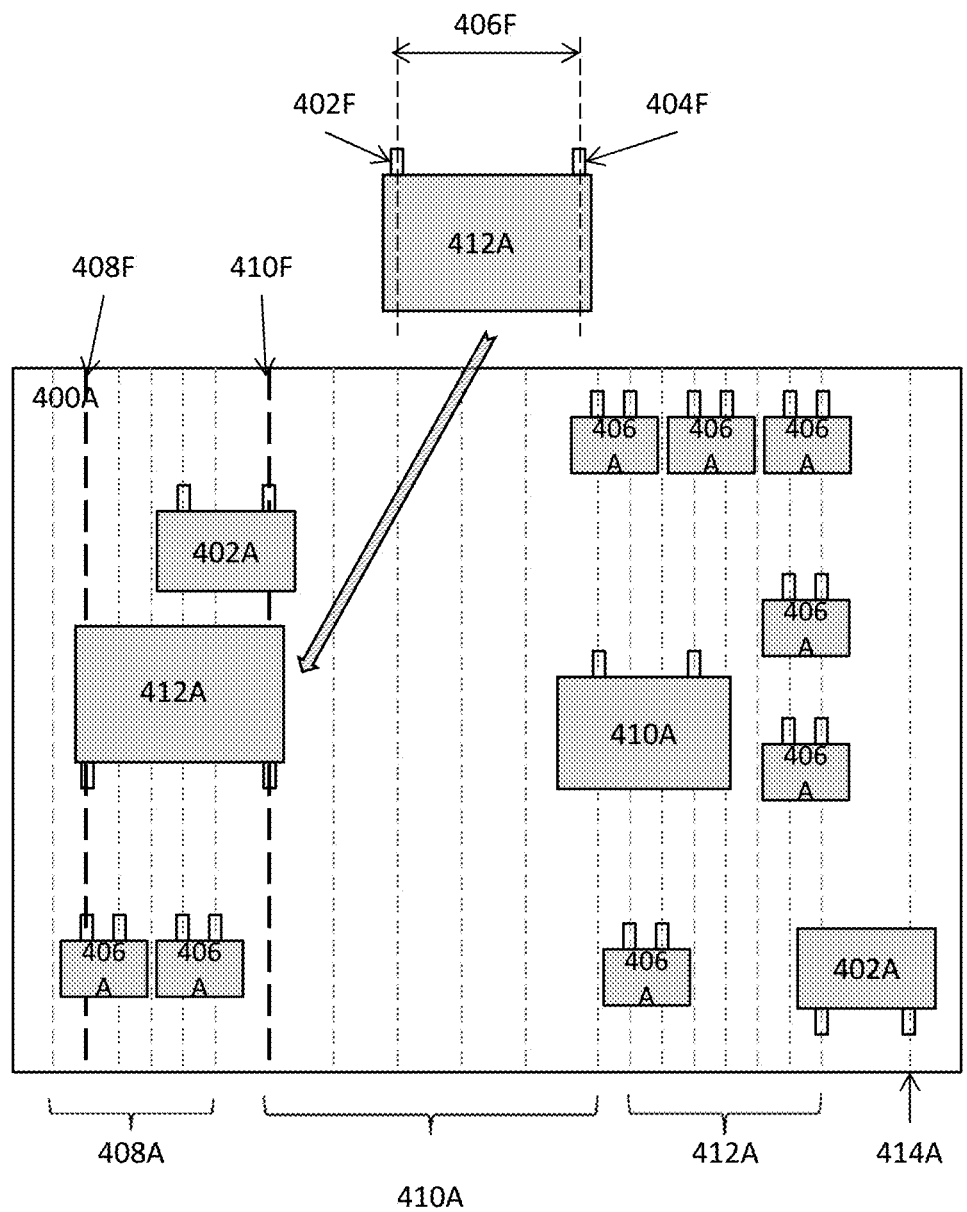

FIG. 4F illustrates inserting an instance of block 412A. For the ease of illustration and description, the block 412A has two pins 402F and 404F that are spaced apart at the spacing 406F. Two routing tracks (408F and 410F) are selected by using identical or substantially similar techniques described above for inserting the instance of blocks 412A. When interconnects are created by a routing module to connect to pins 402F and 404F, these two interconnects inherit the width values respectively associated with routing tracks 408F and 410F. One or more locations are determined for this instance of block 410F while satisfying various DFM requirements as well as design specifications.

Figure 4G:
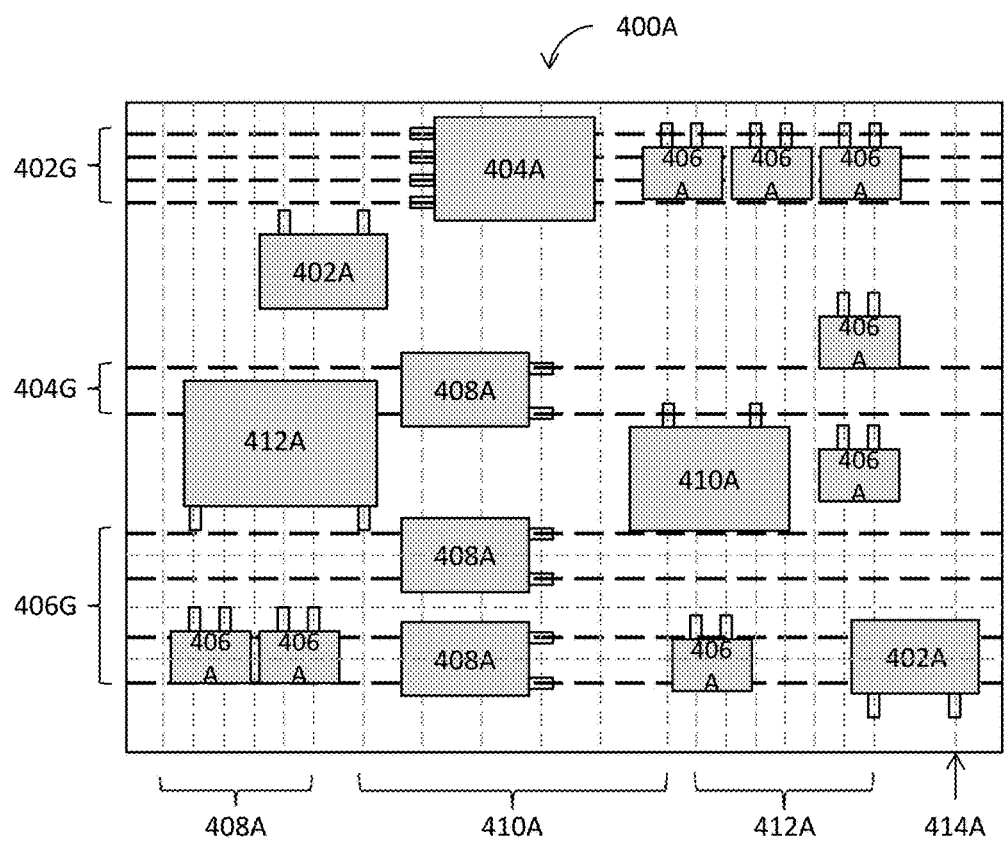

FIG. 4G illustrates inserting instances of blocks 404A and 408A. For the ease of illustration and description, the block 408A has two pins 402E and 404E that have a horizontal routing direction and are spaced apart at a spacing value. Similarly, block 404A has four pins also at a horizontal routing direction. Four routing tracks in track pattern 402G are selected from the manufacturing grids or a set of routing tracks or track patterns by using identical or substantially similar techniques describe above for inserting the instance of blocks 404A. Similarly, routing tracks from track patterns 404G and 406G may also be selected for the insertion of the instances of block 408A. When the interconnects are created by a routing module to connect to these four pins for block 404A, these four interconnects inherit the width values respectively associated with routing tracks. One or more locations are determined for this instance of block 404A while satisfying various DFM requirements as well as design specifications.

As described above, these routing tracks or track patterns may be determined on a block-by-block basis in some embodiments or may be determined for a plurality of blocks at once. For example, the corresponding routing tracks or track patterns may be determined for each instance of a block as the instance is inserted into the floorplan or placement layout in some embodiments. In some other embodiments, multiple instances (e.g., instances of blocks 402A, 406A, and 410A) may be identified at once without individually selecting their respective routing tracks or track patterns. Rather, these techniques described herein may consider these multiple instances together and select the routing tracks or track pattern(s) at once to accommodate these multiple instances in these embodiments.

It shall be noted that although FIG. 4G shows routing tracks in both the horizontal and vertical routing directions, these routing tracks may belong to one or more routing layers. In some embodiments where wrong-way routing is not permitted, the horizontal routing tracks and the vertical routing tracks are implemented on two separate routing layers each of which accommodates routing tracks in only one routing direction. In some other embodiments where wrong-way routing is permitted on a single routing layer, this single routing layer accommodates both the horizontal and vertical routing directions. Whether wrong-way routing is permitted on a single layer may be specified and constrained in a routing constraint that is processed by a routing module. Nevertheless, the identification of routing tracks or track patterns described herein may further aid the routing module to route the electronic design.

FIG. 1A illustrates a high level schematic block diagram for implementing a physical design of an electronic design with DFM and design specification awareness in one or more embodiments. More specifically, FIG. 1A illustrates an illustrative high level schematic block diagrams for implementing a physical design of an electronic design with DFM and design specification awareness and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc. The verification engine 170 may perform formal verification tasks in some embodiments.

In some embodiments, one or more these various resources 128 may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The one or more computing systems 100 may further write to and read from a local or remote non-transitory computer accessible storage 162 that stores thereupon data or information such as, but not limited to, one or more databases (174) such as schematic design database(s) or physical design database(s), design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of modules 152 including hardware modules and software modules or combinations of one or more hardware modules and one or more software modules. Each of these modules may include or function in tandem with electrical circuitry and one or more micro-processors each having one or more processor cores to perform its intended functions. One or more of the modules in 152 may function alone or may function in conjunction with one or more other modules to perform their respective functions for graph-driven verification and debugging of electronic designs.

The computing system may also include one or more modules in the set of modules 152. One or more modules in the set 152 may include or at least function in tandem with a microprocessor 192 via a computer bus 194 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a system bus 196 to read and/or write data during the microprocessor's execution of processes.

The hardware system may further include one or more forms of non-transitory machine-readable storage media or persistent storage blocks to temporarily or persistently store various types of data or information, various design rules, various libraries, selected and selectable targets, or any other suitable information or data, etc. A module is initialized in a computing system so that the software portion of the module is stored in memory (e.g., random access memory) to be executed by one or more processors or processor cores off the computing system to perform at least a part of the functionality of the module. Some illustrative modules or components of the hardware system may be found in the System Architecture Overview section below.

The set of modules 152 may comprise one or more electrical analysis modules 102 to perform one or more electrical analyses for an electronic design. For example, an electrical analysis module 102 may perform a schematic level simulation for an electronic design to determine electrical characteristics (e.g., various electric currents, voltages, etc.) The set of modules 152 may further include an electrical parasitic generation module 108 to determine pertinent electrical parasitics pertaining to one or more DFM requirements for an electronic design.

The set of modules 152 may also include one or more sensitivity modules 104 that perform one or more sensitivity analyses to determine how sensitive a design attribute (e.g., a design intent or requirement in a requirement specification, an electrical or power specification, etc.) is with respect to a block or a block parameter. The results of these one or more sensitivity analyses may be used to identify blocks or parameters thereof that exhibit more significant impacts on the compliance (or non-compliance) with the design specification or to filter out blocks or parameters thereof that exhibit less significant impacts on the compliance (or non-compliance) with the design specification so as to reduce utilization of computational resources (e.g., memory footprint, runtime, etc.) of subsequent operations.

The set of modules 152 may further optionally include a ranking or prioritization module 106 to prioritize, rank, or order a list of blocks in an electronic design. A ranking or prioritization module 106 may function in tandem with a sensitivity analysis module 104 to rank a plurality of blocks or block parameters of an electronic design according to their respective sensitivity levels and to identify a number of highest ranked blocks or block parameters from the original set of blocks or block parameters into a reduced set of blocks or block parameters or to discard a number of lowest ranked blocks or block parameters from the original set of blocks or block parameters to create a reduced set of blocks or block parameters.

The set of modules 152 may also include one or more DFM modules 110 that may perform various analyses to determine whether an electronic design meets various DFM requirements. These one or more DFM modules 110 may also generate DFM requirements for an electronic design based in part or in whole upon information or data including, for example, the design specification, a technology file from a foundry that is to manufacture the electronic circuit according to the electronic design, pertinent electrical characteristics (e.g., electric currents, voltages, resistances, inductances, etc.) of various nodes in the electronic design, etc.

These DFM requirements may be used to guide a floorplanner (or a placement module) to insert a plurality of blocks into a floorplan (or a placement layout). Because a DFM requirement for an interconnect is generated based in part or in whole upon pertinent electrical characteristics that are in turn generated in light of the design specification, the floorplan or the placement thus generated satisfies both the design specification and the DFM requirements.

The set of modules 152 may include one or more annotation modules 112 that annotate or associate various properties, characteristics, implementing options (e.g., placement or floorplanning options, routing options, etc.), requirements with corresponding nodes (e.g., pins, ports, etc.) or boundaries (e.g., boundaries of a block). The set of modules 152 may further optionally include one or more signoff modules (not shown) to perform various signoff and design closure tasks to ensure that the electronic design implemented by various techniques described herein may be successfully fabricated or ready for manufacturing while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals as well as various DFM requirements in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments.

In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

Figure 1B:
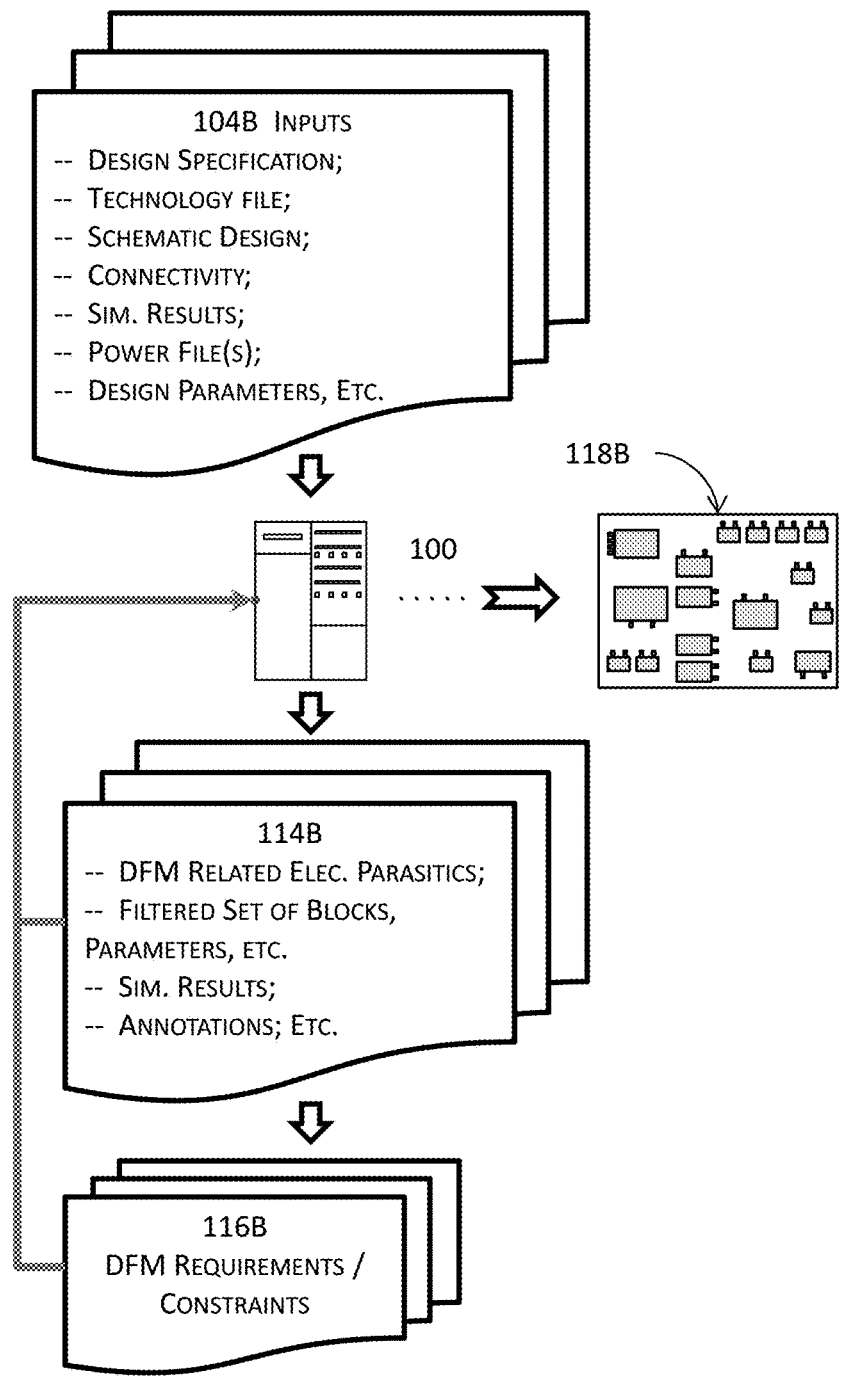
FIG. 1B illustrates another high level schematic block diagram for implementing a physical design of an electronic design with DFM and design specification awareness in one or more embodiments.

FIG. 1B illustrates another high level schematic block diagram for implementing a physical design of an electronic design with DFM and design specification awareness in one or more embodiments. More specifically, FIG. 1B illustrates various inputs 104B into one or more computing system 100 that perform various tasks as described herein to generate various intermediate results 114B and 116B that may be further fed back into these one or more computing systems 100 to generate a floorplan or placement layout 118B. In some embodiments, these one or more inputs 104B may include, for example, one or more design specifications (e.g., a requirement specification, an electrical specification, a power specification or power intent file, etc.).

These one or more inputs 104B may also include a technology file specifying various pieces of information concerning variability, design rules, properties, and/or characteristics of circuit components. A schematic design of an electronic design may also be identified as an input 104B, and the schematic design may include or correspond to connectivity information that delineates how and where various blocks in the electronic design are connected with each other. Steady-state or transient electrical simulation results may also be a part of these one or more inputs 104B. These electrical simulation results may be used, for example, to facilitate sensitivity analyses that determine blocks or parameters thereof exhibiting more significant impacts on the compliance (or non-compliance) with design specifications. These one or more inputs 104B may additionally or alternatively include a power intent file or a power specification as well as various design parameters.

These one or more computing systems 100 receive one or more of these inputs 104B to generate intermediate results 114B that may include, for example, DFM related electric parasitics (e.g., minimum or maximum electric currents, capacitances, resistances, inductances, etc.) These intermediate results 114B may also include a filtered or reduced list of blocks that is obtained by using, for example, a ranking or prioritizing module 106 and a sensitivity analysis module 104. In addition or in the alternative, these one or more computing systems 100 may perform electrical analyses or simulations to generate simulation results as a part of the intermediate results 114B. Annotations of various characteristics, attributes, requirements, implementation options, etc. may also be generated by these one or more computing systems 100 as a part of the intermediate results.

These intermediate results 114B may be further processed by the one or more computing systems 100 to generate DFM requirements or constraints 1166. Some or all of the intermediate results 114B and the DFM requirements or constraints 116B may be further utilized by the one or more computing systems 100 to generate a floorplan or a placement layout 1186 that automatically complies with various DFM requirements as well as the design specifications even if a layout engineer implementing the floorplan or placement layout is not aware of or completely lacks the knowledge of any such specifications or requirements.

System Architecture Overview

Figure 5:
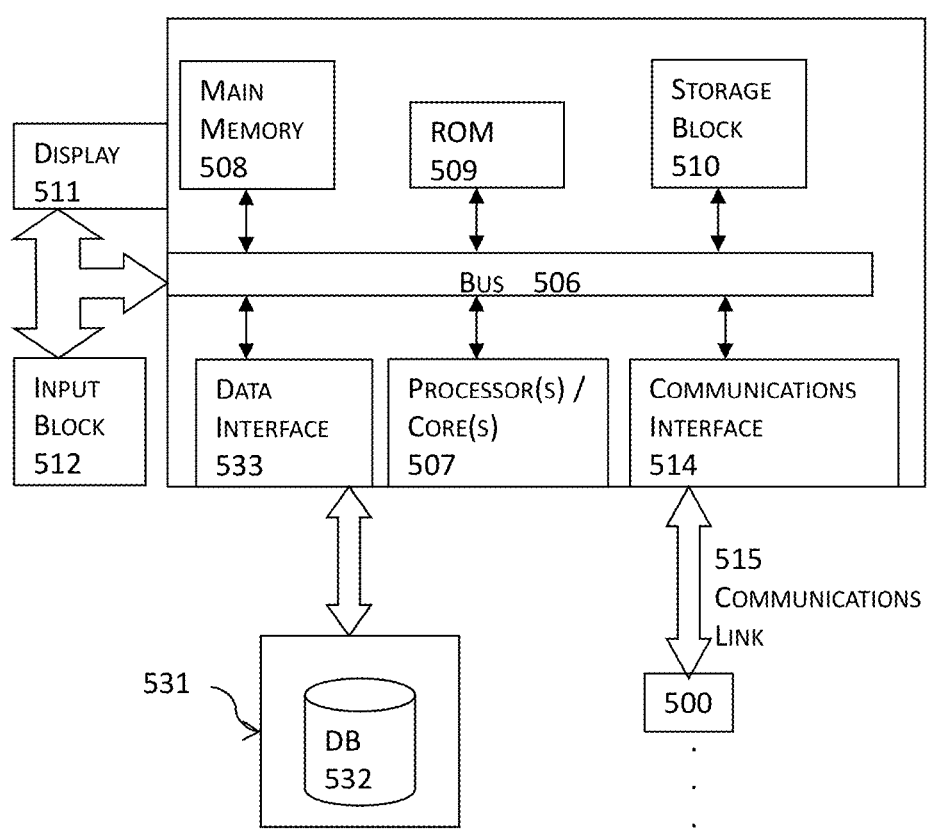
FIG. 5 illustrates a computerized system on which a process for implementing a physical design of an electronic design with DFM and design specification awareness may be implemented.

FIG. 5 illustrates a block diagram of an illustrative computing system 500 suitable for graph-driven verification and debugging of an electronic design as described in the preceding paragraphs with reference to various figures. Computer system 500 includes a bus 506 or other communication module for communicating information, which interconnects subsystems and blocks, such as processor 507, system memory 508 (e.g., RAM), static storage block 509 (e.g., ROM), disk drive 510 (e.g., magnetic or optical), communication interface 514 (e.g., modem or Ethernet card), display 511 (e.g., CRT or LCD), input block 512 (e.g., keyboard), and cursor control (not shown).

According to one embodiment, computing system 500 performs specific operations by one or more processor or processor cores 507 executing one or more sequences of one or more instructions contained in system memory 508. Such instructions may be read into system memory 508 from another computer readable/usable storage medium, such as static storage block 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of determination, compression, decompression, etc. may be performed by one or more modules (e.g., one or more modules described in FIG. 1) including or functioning in tandem with one or more processors, one or more processor cores, or combination thereof.

A module described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may be stored at least partially in memory and may also include or function in tandem with, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs. To the extent that a module includes a piece of software, the software is stored in a non-transitory computer accessible storage medium such as computer memory.

The term "computer readable storage medium" or "computer usable storage medium" as used herein refers to any non-transitory computer accessible storage medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computing system 500 operates in conjunction with a data storage system 531, e.g., a data storage system 531 that includes a database 532 that is readily accessible by the computing system 500. The computing system 500 communicates with the data storage system 531 through a data interface 533. A data interface 533, which is coupled with the bus 506, transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for implementing a physical design of an electronic design with design for manufacturing (DFM) and design specification awareness, comprising:

identifying one or more design specifications or design intent and a set of blocks for generating a floorplan or a placement layout of an electronic design;

reducing a set of parameters pertaining to the set of blocks into a reduced set of parameters at least by ignoring or discarding at least one parameter in the set, wherein the set of blocks comprises one or more blocks or pertains to one or more block parameters, and the set of blocks comprises one or more blocks or pertains to one or more block parameters exhibit less significant impact on compliance with the one or more design specifications or the design intent from a sensitivity analysis performed on the electronic design;

determining floorplanning or placement requirements based in part or in whole upon pertinent electrical parasitics, the reduced set of parameters, and the one or more design specifications or design intent;

reducing the set of blocks into a reduced set of blocks at least by filtering out at least one block from the set of blocks based in part or in whole upon apportioning behaviors of the electronic design to at least some of the set of blocks; and generating, at a floorplanning or placement module stored at least partially in memory and including or functioning in tandem with at least one microprocessor, the floorplan or the placement layout in a database at least by inserting one or more blocks from the reduced set of blocks based in part or in whole upon the floorplanning or placement requirements.

2. The computer implemented method of claim 1, further comprising:

identifying a technology file for the electronic design; and determining the floorplanning or placement requirements based further in part upon the technology file.

3. The computer implemented method of claim 2, further comprising:

determining electrical parasitics for at least a part of the electronic design at least by performing one or more electrical analyses based in part or in whole upon the one or more design specifications or design intent;

extracting the pertinent electrical parasitics for the at least a part of the electronic design from the electrical parasitics; and generating derived electrical parasitics at least by deriving the derived electrical parasitics based in part or in whole upon the pertinent electrical parasitics and the one or more design specifications or design intent.

4. The computer implemented method of claim 3, further comprising:

determining one or more design for manufacturing (DFM) requirements based in part or in whole upon the one or more design specifications or design intent, the technology file, the pertinent electrical parasitics, and the derived electrical parasitics; and identifying a set of routing tracks or one or more track patterns into the floorplanning or placement requirements based in part or in whole upon the one or more DFM requirements and the one or more design specifications or design intent.

5. The computer implemented method of claim 3, further comprising:

identifying one or more blocks from the set of blocks;

identifying one or more pins or ports for the one or more blocks;

determining one or more corresponding locations for the one or more blocks in the floorplan or the placement layout based in part or in whole upon the floorplanning or placement requirements; and inserting the one or more blocks at the one or more corresponding locations in the floorplan or placement layout.

6. The computer implemented method of claim 5, further comprising:
determining routing requirements and routing options for the one or more pins or ports of the one or more blocks based in part or in whole upon the floorplanning or placement requirements; and
associating or annotating the one or more pins or ports of the one or more blocks with the routing requirements and routing options.

7. The computer implemented method of claim 6, further comprising:
generating a post-route layout at least by interconnecting the set of blocks in the floorplan or the placement layout based in part or in whole upon connectivity information, the routing requirements, and the routing options;
determining whether the floorplan, the placement layout, or the post-route layout meets the one or more design specifications or design intent and design for manufacturing requirements; and
performing one or more fixes on the floorplan, the placement layout, or the post-route layout when the floorplan, the placement layout, or the post-route layout is determined not to meet the one or more design specifications or design intent and the design for manufacturing requirements.

8. The computer implemented method of claim 1, further comprising:
performing one or more sensitivity analyses on the electronic design based in part or in whole upon at least some of the electrical parasitics;
identifying one or more blocks or block parameters thereof from the set of blocks that exhibit less significant impacts on the compliance with the one or more design specifications or design intent based in part or in whole upon results of the one or more sensitivity analyses; and
reducing the set of parameters pertaining to the set of blocks into the reduced set of parameters at least by ignoring one or more parameters from the set of parameters pertaining to the set of blocks.

9. The computer implemented method of claim 8, further comprising:
determining the pertinent electrical parasitics only for the reduced set of blocks not for the one or more blocks; and
determining the floorplanning or placement requirements only for the reduced set of blocks but not for the one or more blocks.

10. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing a physical design of an electronic design with design for manufacturing (DFM) and design specification awareness, the set of acts comprising:
identifying one or more design specifications or design intent and a set of blocks for generating a floorplan or a placement layout of an electronic design;
reducing a set of parameters pertaining to the set of blocks into a reduced set of parameters at least by ignoring or discarding at least one parameter in the set, wherein the set of blocks comprises one or more blocks or pertains to one or more block parameters, and the set of blocks comprises one or more blocks or pertains to one or more block parameters exhibit less significant impact on compliance with the one or more design specifications or the design intent from a sensitivity analysis performed on the electronic design;
determining floorplanning or placement requirements based in part or in whole upon pertinent electrical parasitics, the reduced set of parameters, and the one or more design specifications or design intent;
reducing the set of blocks into a reduced set of blocks at least by filtering out at least one block from the set of blocks based in part or in whole upon apportioning behaviors of the electronic design to at least some of the set of blocks; and
generating, at a floorplanning or placement module stored at least partially in memory and including or functioning in tandem with at least one microprocessor, the floorplan or the placement layout at least by inserting one or more blocks from the reduced set of blocks based in part or in whole upon the floorplanning or placement requirements.

11. The article of manufacture of claim 10, the set of acts further comprising:
identifying a technology file for the electronic design;
determining the floorplanning or placement requirements based further in part upon the technology file;
determining electrical parasitics for at least a part of the electronic design at least by performing one or more electrical analyses based in part or in whole upon the one or more design specifications or design intent;
extracting the pertinent electrical parasitics for the at least a part of the electronic design from the electrical parasitics; and
generating derived electrical parasitics at least by deriving the derived electrical parasitics based in part or in whole upon the pertinent electrical parasitics and the one or more design specifications or design intent.

12. The article of manufacture of claim 11, the set of acts further comprising:
determining one or more design for manufacturing (DFM) requirements based in part or in whole upon the one or more design specifications or design intent, the technology file, the pertinent electrical parasitics, and the derived electrical parasitics; and
identifying a set of routing tracks or one or more track patterns into the floorplanning or placement requirements based in part or in whole upon the one or more DFM requirements and the one or more design specifications or design intent.

13. The article of manufacture of claim 11, the set of acts further comprising:
identifying one or more blocks from the set of blocks;
identifying one or more pins or ports for the one or more blocks;
determining one or more corresponding locations for the one or more blocks in the floorplan or the placement layout based in part or in whole upon the floorplanning or placement requirements; and
inserting the one or more blocks at the one or more corresponding locations in the floorplan or placement layout.

14. The article of manufacture of claim 13, the set of acts further comprising:
determining routing requirements and routing options for the one or more pins or ports of the one or more blocks based in part or in whole upon the floorplanning or placement requirements; and associating or annotating the one or more pins or ports of the one or more blocks with the routing requirements and routing options.

15. The article of manufacture of claim 14, the set of acts further comprising:

generating a post-route layout at least by interconnecting the set of blocks in the floorplan or the placement layout based in part or in whole upon connectivity information, the routing requirements, and the routing options;

determining whether the floorplan, the placement layout, or the post-route layout meets the one or more design specifications or design intent and design for manufacturing requirements; and performing one or more fixes on the floorplan, the placement layout, or the post-route layout when the floorplan, the placement layout, or the post-route layout is determined not to meet the one or more design specifications or design intent and the design for manufacturing requirements.

16. A system for implementing a physical design of an electronic design with design for manufacturing (DFM) and design specification awareness, comprising:

one or more modules, at least one of which is stored in part or in whole in memory and comprises at least one processor including one or more processor cores executing one or more threads in a computing system;

a non-transitory computer accessible storage medium storing thereupon program code that includes a sequence of instructions that, when executed by the at least one processor, causes the at least one processor at least to:

identify one or more design specifications and a set of blocks for generating a floorplan or a placement layout of an electronic design and the one or more design specifications or design intent;

reduce a set of parameters pertaining to the set of blocks into a reduced set of parameters at least by ignoring or discarding at least one parameter in the set, wherein the set of blocks comprises one or more blocks or pertains to one or more block parameters, and the set of blocks comprises one or more blocks or pertains to one or more block parameters exhibit less significant impact on compliance with the one or more design specifications or the design intent from a sensitivity analysis performed on the electronic design;

determine floorplanning or placement requirements based in part or in whole upon pertinent electrical parasitics, the reduced set of parameters, and the one or more design specifications or the design intent;

reduce the set of blocks into a reduced set of blocks at least by filtering out at least one block from the set of blocks based in part or in whole upon apportioning behaviors of the electronic design to at least some of the set of blocks; and generate, at a floorplanning or placement module stored at least partially in memory and including or functioning in tandem with at least one microprocessor, the floorplan or the placement layout at least by inserting one or more blocks from the reduced set of blocks based in part or in whole upon the floorplanning or placement requirements.

17. The system of claim 16, wherein the program code includes the sequence of instructions that, when executed by the at least one processor, further cause the at least one processor to:

perform one or more sensitivity analyses on the electronic design based in part or in whole upon at least some of the electrical parasitics;

identify one or more blocks or block parameters thereof from the set of blocks that exhibit less significant impacts on the compliance with the one or more design specifications or design intent based in part or in whole upon results of the one or more sensitivity analyses; and reduce the set of parameters pertaining to the set of blocks into the reduced set of parameters at least by ignoring one or more parameters from the set parameters.

18. The system of claim 17, wherein the program code includes the sequence of instructions that, when executed by the at least one processor, further cause the at least one processor to:

determine the pertinent electrical parasitics only for the reduced set of blocks not for the one or more blocks; and determine the floorplanning or placement requirements only for the reduced set of blocks but not for the one or more blocks.

19. The system of claim 16, wherein the program code includes the sequence of instructions that, when executed by the at least one processor, further cause the at least one processor to:

identify a technology file for the electronic design;

determine the floorplanning or placement requirements based further in part upon the technology file;

determine electrical parasitics for at least a part of the electronic design at least by performing one or more electrical analyses based in part or in whole upon the one or more design specifications or design intent;

extract the pertinent electrical parasitics for the at least a part of the electronic design from the electrical parasitics; and generate derived electrical parasitics at least by deriving the derived electrical parasitics based in part or in whole upon the pertinent electrical parasitics and the one or more design specifications or design intent.

20. The system of claim 19, wherein the program code includes the sequence of instructions that, when executed by the at least one processor, further cause the at least one processor to:

determine one or more design for manufacturing (DFM) requirements based in part or in whole upon the one or more design specifications or design intent, the technology file, the pertinent electrical parasitics, and the derived electrical parasitics;

identify a set of routing tracks or one or more track patterns into the floorplanning or placement requirements based in part or in whole upon the one or more DFM requirements and the one or more design specifications or design intent;

identify one or more blocks from the set of blocks;

identify one or more pins or ports for the one or more blocks;

determine one or more corresponding locations for the one or more blocks in the floorplan or the placement layout based in part or in whole upon the floorplanning or placement requirements; and insert the one or more blocks at the one or more corresponding locations in the floorplan or placement layout.

* * * * *